US012786913B2

(12) United States Patent
Yang et al.

(10) Patent No.: US 12,786,913 B2
(45) Date of Patent: Nov. 3, 2026

(54) TECHNIQUES FOR PROPAGATION DELAY COMPENSATION (PDC)

(71) Applicant: QUALCOMM INCORPORATED, San Diego, CA (US)

(72) Inventors: Luanxia Yang, Beijing (CN); Changlong Xu, Beijing (CN); Rajat Prakash, San Diego, CA (US); Jing Sun, San Diego, CA (US); Xiaoxia Zhang, San Diego, CA (US); Ozcan Ozturk, San Diego, CA (US); Jing Dai, Beijing (CN); Shaozhen Guo, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 18/699,851

(22) PCT Filed: Dec. 22, 2021

(86) PCT No.: PCT/CN2021/140313
§ 371 (c)(1),
(2) Date: Apr. 9, 2024

(87) PCT Pub. No.: WO2023/115364
PCT Pub. Date: Jun. 29, 2023

(65) Prior Publication Data

US 2024/0414670 A1 Dec. 12, 2024

(51) Int. Cl.
*H04W 56/00* (2009.01)
*H04W 92/18* (2009.01)

(52) U.S. Cl.
CPC .......... *H04W 56/004* (2013.01); *H04W 92/18* (2013.01)

(58) Field of Classification Search
CPC ..... H04W 4/40; H04W 72/10; H04W 56/004; H04W 56/005; H04W 92/18;
(Continued)

(56) References Cited

U.S. PATENT DOCUMENTS

| | | | |
|---|---|---|---|
| 2020/0112941 A1 | 4/2020 | Yerramalli et al. | |
| 2021/0219253 A1 * | 7/2021 | Van Phan | H04W 56/004 |

(Continued)

FOREIGN PATENT DOCUMENTS

| | | |
|---|---|---|
| CN | 112789826 | 5/2021 |
| WO | WO-2020072754 A1 | 4/2020 |
| WO | WO-2021225511 A1 | 11/2021 |

OTHER PUBLICATIONS

ETSI MCC: "Report of 3GPP TSG RAN WG2 Meeting #114-e, Online", 3GPP TSG-RAN WG2 meeting #115-e, R2-2106901, Agenda Item: 02.2, 294 Pages, Aug. 5, 2021 (Aug. 5, 2021), pp. 86, 122-123.

(Continued)

*Primary Examiner* — Phuoc H Doan
(74) *Attorney, Agent, or Firm* — Holland & Hart LLP/Qualcomm

(57) ABSTRACT

This disclosure provides systems, methods and apparatus, including computer programs encoded on computer storage media, for propagation delay compensation (PDC). In some systems, a network entity and a group of user equipment (UEs) may support a group-based PDC procedure according to which the network entity may provide group-based PDC information to the group of UEs. In some aspects, a UE may participate in such a group-based PDC procedure in accordance with a clock accuracy constraint of the UE and depending on whether other UEs are likely to have similar PDC information. The network entity may assign an identifier (ID) to the group of UEs and scramble a message including the group-based PDC information using the ID. As
(Continued)

such, UEs of the group of UEs may decode the message using the ID and adjust a timing of communications with the network entity using the group-based PDC information.

30 Claims, 11 Drawing Sheets

(58) Field of Classification Search
CPC ........... H04W 56/001; H04W 56/0055; H04W 28/0268; H04W 28/0263; H04L 41/0893; H04L 47/18
See application file for complete search history.

(56) References Cited

U.S. PATENT DOCUMENTS

| | | | | |
|---|---|---|---|---|
| 2023/0063750 | A1* | 3/2023 | Loehr | H04W 52/383 |
| 2024/0259862 | A1* | 8/2024 | Harounabadi | H04W 76/23 |

OTHER PUBLICATIONS

International Search Report and Written Opinion—PCT/CN2021/140313—ISA/EPO—May 30, 2022 (2200520WO1).

* cited by examiner

TECHNIQUES FOR PROPAGATION DELAY COMPENSATION (PDC)

CROSS REFERENCE

The present Application is a 371 national stage filing of International PCT Application No. PCT/CN2021/140313 by Yang et al. entitled "TECHNIQUES FOR PROPAGATION DELAY COMPENSATION (PDC)," filed Dec. 22, 2021, which is assigned to the assignee hereof, and which is expressly incorporated by reference in its entirety herein.

TECHNICAL FIELD

This disclosure relates to wireless communications, including techniques for propagation delay compensation (PDC).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a network entity, control signaling indicating an identifier (ID) of a group of UEs associated with a common set of one or more propagation delay compensation (PDC) values, receiving, from the network entity, the common set of one or more PDC values, and communicating with the network entity in accordance with the common set of one or more PDC values.

Another innovative aspect of the subject matter described in this disclosure can be implemented in an apparatus for wireless communications at a UE. The apparatus may include an interface and a processing system. The interface may be configured to obtain, from a network entity, control signaling indicating an ID of a group of UEs associated with a common set of one or more PDC values, obtain, from the network entity, the common set of one or more PDC values, and communicate with the network entity in accordance with the common set of one or more PDC values.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a network entity, control signaling indicating an ID of a group of UEs associated with a common set of one or more PDC values, receive, from the network entity, the common set of one or more PDC values, and communicate with the network entity in accordance with the common set of one or more PDC values.

Another innovative aspect of the subject matter described in this disclosure can be implemented in another apparatus for wireless communications at a UE. The apparatus may include means for receiving, from a network entity, control signaling indicating an ID of a group of UEs associated with a common set of one or more PDC values, means for receiving, from the network entity, the common set of one or more PDC values, and means for communicating with the network entity in accordance with the common set of one or more PDC values.

Another innovative aspect of the subject matter described in this disclosure can be implemented in a non-transitory computer-readable medium storing code for wireless communications at a UE. The code may include instructions executable by a processor to receive, from a network entity, control signaling indicating an ID of a group of UEs associated with a common set of one or more PDC values, receive, from the network entity, the common set of one or more PDC values, and communicate with the network entity in accordance with the common set of one or more PDC values.

In some implementations of the method, apparatuses, and non-transitory computer-readable medium described herein, the control signaling includes an indication of the ID of the group of UEs in accordance with a communication type associated with the UE.

In some implementations of the method, apparatuses, and non-transitory computer-readable medium described herein, the control signaling includes an indication of the ID of the group of UEs in accordance with the UE being located in a geographic area associated with a same zone ID as others of the group of UEs.

In some implementations of the method, apparatuses, and non-transitory computer-readable medium described herein, the control signaling includes an indication of the ID of the group of UEs in accordance with a sidelink channel measurement by the UE satisfying a threshold sidelink channel measurement.

In some implementations of the method, apparatuses, and non-transitory computer-readable medium described herein, receiving the common set of one or more PDC values in accordance with the ID of the group of UEs may include operations, features, means, or instructions for receiving, over a downlink shared channel, an indication of the common set of one or more PDC values via a message that may be scrambled in accordance with the ID of the group of UEs and decoding the message using the ID of the group of UEs.

Another innovative aspect of the subject matter described in this disclosure can be implemented in a method for wireless communications at a UE. The method may include receiving, from a network entity, a set of one or more PDC values in accordance with a selection between a group-based PDC procedure for the UE and a UE-specific PDC procedure for the UE and communicating with the network entity in accordance with the set of one or more PDC values.

Another innovative aspect of the subject matter described in this disclosure can be implemented in an apparatus for wireless communications at a UE. The apparatus may include an interface and a processing system. The interface may be configured to obtain, from a network entity, a set of one or more PDC values in accordance with a selection between a group-based PDC procedure for the UE and a UE-specific PDC procedure for the UE and communicate with the network entity in accordance with the set of one or more PDC values.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a network entity, a set of one or more PDC values in accordance with a selection between a group-based PDC procedure for the UE and a UE-specific PDC procedure for the UE and communicate with the network entity in accordance with the set of one or more PDC values.

Another innovative aspect of the subject matter described in this disclosure can be implemented in another apparatus for wireless communications at a UE. The apparatus may include means for receiving, from a network entity, a set of one or more PDC values in accordance with a selection between a group-based PDC procedure for the UE and a UE-specific PDC procedure for the UE and means for communicating with the network entity in accordance with the set of one or more PDC values.

Another innovative aspect of the subject matter described in this disclosure can be implemented in a non-transitory computer-readable medium storing code for wireless communications at a UE. The code may include instructions executable by a processor to receive, from a network entity, a set of one or more PDC values in accordance with a selection between a group-based PDC procedure for the UE and a UE-specific PDC procedure for the UE and communicate with the network entity in accordance with the set of one or more PDC values.

Some implementations of the method, apparatuses, and non-transitory computer-readable medium described herein may further include operations, features, means, or instructions for receiving, from the network entity, an indication associated with the selection between the group-based PDC procedure for the UE and the UE-specific PDC procedure for the UE, where receiving the set of one or more PDC values may be associated with the receiving of the indication associated with the selection.

Some implementations of the method, apparatuses, and non-transitory computer-readable medium described herein may further include operations, features, means, or instructions for transmitting, to the network entity, an indication associated with the selection between the group-based PDC procedure for the UE and the UE-specific PDC procedure for the UE, where receiving the set of one or more PDC values may be associated with the transmitting of the indication associated with the selection.

One innovative aspect of the subject matter described in this disclosure can be implemented in a method for wireless communications at a network entity. The method may include transmitting, to a UE, control signaling indicating an ID of a group of UEs associated with a common set of one or more PDC values, transmitting, to the UE, the common set of one or more PDC values in accordance with the ID of the group of UEs, and communicating with the UE in accordance with the common set of one or more PDC values.

Another innovative aspect of the subject matter described in this disclosure can be implemented in an apparatus for wireless communications at a network entity. The apparatus may include an interface and a processing system. The interface may be configured to output, to a UE, control signaling indicating an ID of a group of UEs associated with a common set of one or more PDC values, output, to the UE, the common set of one or more PDC values in accordance with the identifier of the group of UEs, and communicate with the UE in accordance with the common set of one or more PDC values.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, control signaling indicating an ID of a group of UEs associated with a common set of one or more PDC values, transmit, to the UE, the common set of one or more PDC values in accordance with the ID of the group of UEs, and communicate with the UE in accordance with the common set of one or more PDC values.

Another innovative aspect of the subject matter described in this disclosure can be implemented in another apparatus for wireless communications at a network entity. The apparatus may include means for transmitting, to a UE, control signaling indicating an ID of a group of UEs associated with a common set of one or more PDC values, means for transmitting, to the UE, the common set of one or more PDC values in accordance with the ID of the group of UEs, and means for communicating with the UE in accordance with the common set of one or more PDC values.

Another innovative aspect of the subject matter described in this disclosure can be implemented in a non-transitory computer-readable medium storing code for wireless communications at a network entity. The code may include instructions executable by a processor to transmit, to a UE, control signaling indicating an ID of a group of UEs associated with a common set of one or more PDC values, transmit, to the UE, the common set of one or more PDC values in accordance with the ID of the group of UEs, and communicate with the UE in accordance with the common set of one or more PDC values.

In some implementations of the method, apparatuses, and non-transitory computer-readable medium described herein, the control signaling includes an indication of the ID of the group of UEs in accordance with a communication type associated with the UE.

In some implementations of the method, apparatuses, and non-transitory computer-readable medium described herein, the control signaling includes an indication of the ID of the group of UEs in accordance with the UE being located in a geographic area associated with a same zone ID as others of the group of UEs.

In some implementations of the method, apparatuses, and non-transitory computer-readable medium described herein, the control signaling includes an indication of the ID of the group of UEs in accordance with a sidelink channel measurement by the UE satisfying a threshold sidelink channel measurement.

In some implementations of the method, apparatuses, and non-transitory computer-readable medium described herein, transmitting the common set of one or more PDC values in accordance with the ID of the group of UEs may include operations, features, means, or instructions for encoding a message including an indication of the common set of one or more PDC values via a scrambling of the message in accordance with the ID of the group of UEs and transmitting, over a downlink shared channel, the indication of the common set of one or more PDC values via the message that may be scrambled in accordance with the ID of the group of UEs.

Another innovative aspect of the subject matter described in this disclosure can be implemented in a method for wireless communications at a network entity. The method may include transmitting, to a UE, a set of one or more PDC values in accordance with a selection between a group-based PDC procedure for the UE and a UE-specific PDC procedure for the UE and communicating with the UE in accordance with the set of one or more PDC values.

Another innovative aspect of the subject matter described in this disclosure can be implemented in an apparatus for wireless communications at a network entity. The apparatus may include an interface and a processing system. The interface may be configured to output, to a UE, a set of one or more PDC values in accordance with a selection between a group-based PDC procedure for the UE and a UE-specific PDC procedure for the UE and communicate with the UE in accordance with the set of one or more PDC values.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, a set of one or more PDC values in accordance with a selection between a group-based PDC procedure for the UE and a UE-specific PDC procedure for the UE and communicate with the UE in accordance with the set of one or more PDC values.

Another innovative aspect of the subject matter described in this disclosure can be implemented in another apparatus for wireless communications at a network entity. The apparatus may include means for transmitting, to a UE, a set of one or more PDC values in accordance with a selection between a group-based PDC procedure for the UE and a UE-specific PDC procedure for the UE and means for communicating with the UE in accordance with the set of one or more PDC values.

Another innovative aspect of the subject matter described in this disclosure can be implemented in a non-transitory computer-readable medium storing code for wireless communications at a network entity. The code may include instructions executable by a processor to transmit, to a UE, a set of one or more PDC values in accordance with a selection between a group-based PDC procedure for the UE and a UE-specific PDC procedure for the UE and communicate with the UE in accordance with the set of one or more PDC values.

Some implementations of the method, apparatuses, and non-transitory computer-readable medium described herein may further include operations, features, means, or instructions for transmitting, to the UE, an indication associated with the selection between the group-based PDC procedure for the UE and the UE-specific PDC procedure for the UE, where transmitting the set of one or more PDC values may be associated with the transmitting of the indication associated with the selection.

Some implementations of the method, apparatuses, and non-transitory computer-readable medium described herein may further include operations, features, means, or instructions for receiving, from the UE, an indication associated with the selection between the group-based PDC procedure for the UE and the UE-specific PDC procedure for the UE, where transmitting the set of one or more PDC values may be associated with the receiving of the indication associated with the selection.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
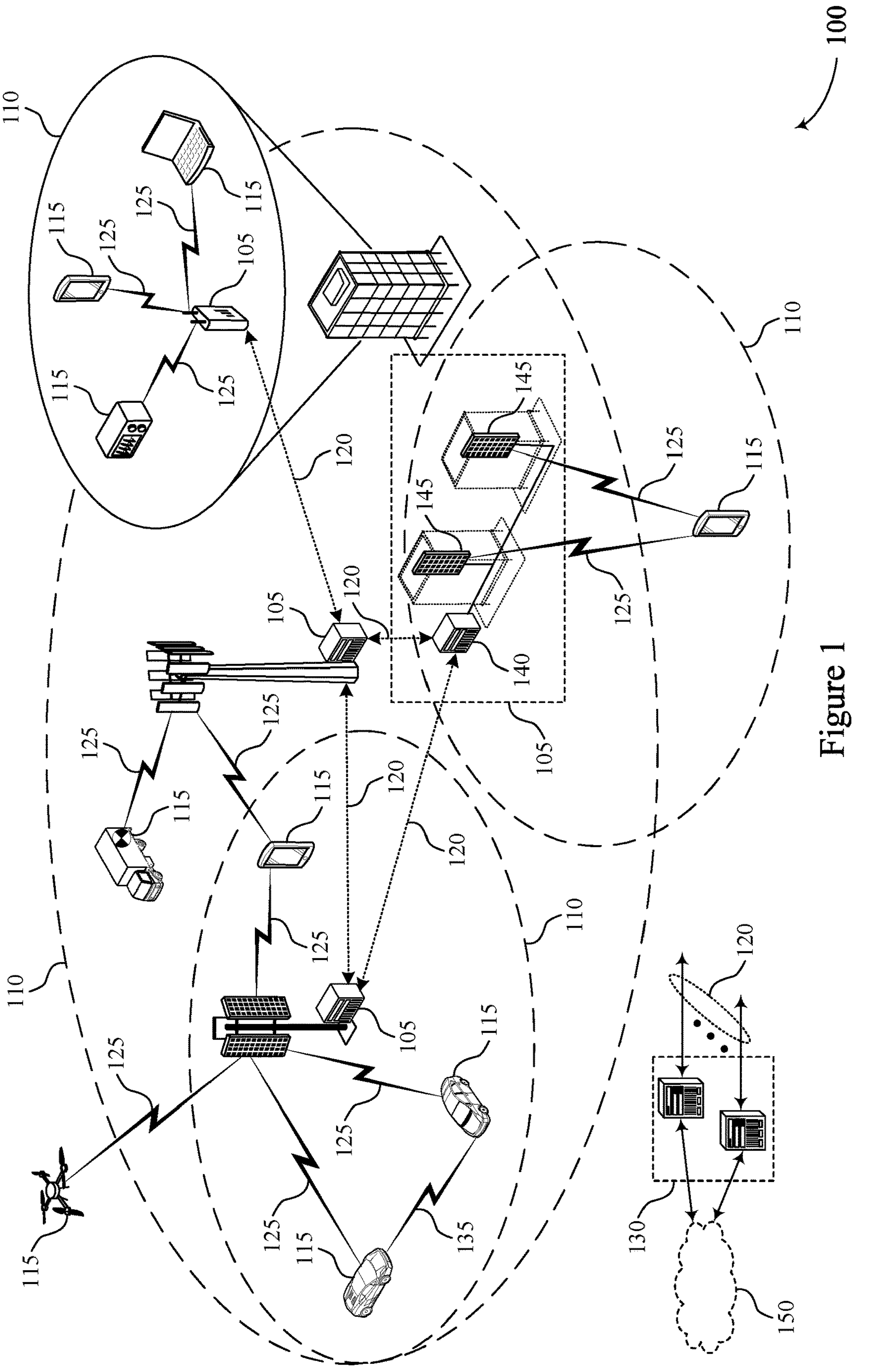
FIG. 1 shows an example wireless communications system that supports techniques for propagation delay compensation (PDC).

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G) or fifth generation (5G), or further implementations thereof, technology.

In some wireless communications systems, over-the-air (OTA) signaling may experience propagation delays that could disrupt a time synchronicity between communicating devices. For example, due to a propagation delay, a receiving device may receive one or more messages at a different time than expected, which may result in the receiving device being unable to successfully decode the one or more messages. This type of propagation delay also may result in a reception time of the one or more messages overlapping (and potentially interfering) with a scheduled transmission or reception of some other messaging. In some systems, at least one device of two communicating devices may adjust a timing of communications to compensate for the propagation delays. For example, a network entity may provide propagation delay compensation (PDC) information to a user equipment (UE) on a per-UE basis, which may enable UE-specific compensation at a cost of increased signaling overhead. In some deployment scenarios, such as scenarios including a relatively large quantity of UEs or UEs that are located relatively close together, however, the signaling overhead associated with UE-specific compensation may detract from overall system efficiency and adversely impact an achievable throughput. In such scenarios, for example, the increased overhead associated with UE-specific compensation may outweigh any benefits resulting from the greater level of granularity associated with UE-specific compensation.

In some implementations of the present disclosure, a network entity and a group of UEs may support a group-based PDC procedure according to which the network entity may provide group-based PDC information to each UE of the group of UEs. The group-based PDC information may include a group-common set of one or more PDC values that each UE of the group of UEs may use to adjust a timing of communications with the network entity. The network entity, or one or more UEs of the group of UEs, may form the group of UEs in accordance with a location of each UE of the group of UEs, a communication type of each UE of the group of UEs (such as, for example, if each UE of the group of UEs commonly communicates with a central sidelink node), or one or more channel measurements at each UE of the group of UEs. To facilitate group-based PDC, one or more UEs of the group of UEs may transmit PDC-associated signaling to the network entity in accordance with a reporting procedure. Such PDC-associated signaling may include one or more PDC reports of round-trip-time (RTT) measurements, sounding reference signal (SRS) transmissions, or a combination thereof. The reporting procedure may indicate which one or more UEs of the group of UEs provide the PDC-associated signaling and how the signaling is to be transmitted. The network entity may use the PDC-associated signaling to measure, generate, calculate, or otherwise determine the group-based PDC information and may transmit the group-based PDC information to the group of UEs. In some implementations, the network entity may encode a message including the group-based PDC information using an identifier (ID), such as a radio network temporary ID (RNTI), of the group of UEs. As such, UEs of the group of UEs may be able to decode the group-based PDC information, while UEs not in the group of UEs may ignore the group-based PDC information. Further, some implementations of the present disclosure provide for a selection mechanism according to which a network entity or a UE may select whether the UE is to participate in a group-based PDC procedure or a UE-specific PDC procedure in accordance with one or more timing measurements or constraints of the UE, or both.

Particular implementations of the subject matter described in this disclosure can be implemented to realize one or more of the following potential advantages. For example, in accordance with some implementations, a UE may participate in a group-based PDC procedure or in a UE-specific PDC procedure depending on a timing measurement or constraint of the UE and in view of an overall spectral efficiency of the system. For example, a UE may opt into (or be configured to participate in) a group-based PDC procedure if a clock accuracy constraint of the UE or a timing measurement associated with the UE satisfies a threshold, which may result in reduced overhead and greater spectral efficiency as the network entity may avoid transmitting signaling that is dedicated for the UE. Further, a network entity or one or more UEs may form a group of UEs for group-based PDC in accordance with how relevant PDC information for one UE of the group would be for another UE of the group, which may support suitable group formation and, likewise, suitable PDC information being conveyed to each UE of the group of UEs. As a result of such greater spectral efficiency and signaling of suitable PDC information for each of a number of UEs, a network entity and UEs within a system may experience or otherwise support higher data rates and greater system capacity, among other benefits.

FIG. 1 shows an example wireless communications system 100 that supports techniques for PDC. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer (PHY) structure for supporting the communication links 125. For example, a carrier used for a communication link 125 may include a portion of a radio frequency spectrum band (such as a bandwidth part (BWP)) that is operated according to one or more PHY channels for a given radio access technology (such as LTE, LTE-A, LTE-A Pro, NR). Each PHY channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof.

The term "cell" may refer to a logical communication entity used for communication with a BS 105 (such as over a carrier) and may be associated with an ID for distinguishing neighboring cells (such as a physical cell ID (PCID), a virtual cell ID (VCID), or others). In some implementations, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (such as several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (such as MTC, narrow band IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the PHY, transport channels may be mapped to physical channels.

A UE 115 and one or more components of a BS 105 may support one or more signaling mechanisms associated with feedback reporting, URLLC, multiplexing and prioritization, time synchronization, or any combination thereof. Such signaling mechanisms may be associated with one or more quality of service (QOS) parameters, such as a survival time parameter or measurement of a burst spread parameter or measurement. For example, a UE 115 and one or more components of a BS 105 may support one or more signaling mechanisms associated with PHY feedback, such as UE feedback or CSI feedback (for more accurate modulation and coding scheme (MCS) selection), for meeting or satisfying one or more URLLC constraints. Additionally, or alternatively, a UE 115 and one or more components of a BS 105 may support one or more signaling mechanisms associated with uplink for URLLC in unlicensed deployments (such as, for example, unlicensed controlled environments). Such signaling mechanisms may involve a UE-initiated channel occupancy time (COT) for frame-based equipment (FBE) or configuring an uplink configured-grant to be compatible with narrow band (NB)-unlicensed (NB-U) and configuring URLLC to be compatible with unlicensed spectrum use.

Additionally, or alternatively, a UE 115 and one or more components of a BS 105 may support one or more signaling mechanisms associated with multiplexing and prioritization of traffic with different priorities. Such signaling mechanisms may involve a defined or configured (such as preconfigured or signaled) multiplexing behavior for HARQ-ACK, scheduling request (SR), or CSI, or any combination thereof, and a physical uplink shared channel (PUSCH) for traffic with different priorities, including scenarios associated with uplink control information (UCI) scheduled on a physical uplink control channel (PUCCH) and UCI multiplexed with data on a PUSCH. Such signaling mechanisms may further involve a PHY prioritization between an overlapping dynamic grant PUSCH and a configured-grant PUSCH of different PHY priorities on a BWP of a serving cell and may further involve cancelation or dropping behavior for the PUSCH of a lower PHY priority.

Additionally, or alternatively, a UE 115 and one or more components of a BS 105 may support one or more signaling mechanisms associated with time synchronization, such as uplink time synchronization for time-sensitive networking (TSN) or PDC for specific deployment scenarios (including scenarios associated with device mobility). For example, in a use or deployment scenario in which a TSN clock (such as a TSN grandmaster clock) is at an end station connected to (such as via a wireless-based connection) a first UE 115 and timing information from the TSN clock is to be related to an end station connected to (such as via a wired-based connection or a wireless-based connection) a second UE 115, two involved Uu interfaces (on their own) may introduce a combined timing uncertainty that exceeds a threshold timing uncertainty for the system (which may be an example of a 5G system). In some aspects, such a threshold timing uncertainty may be associated with a maximum value (such as an upper limit) of 900 nanoseconds. Further, such a timing uncertainty may be associated with a propagation delay.

A propagation delay may refer to or be understood as an amount of time a signal takes to reach a receiver after being sent from a transmitter. In other words, a propagation delay may refer to an amount of time a signal spends "propagating" OTA between a transmitter and a receiver. For a radio link (which may refer to or carry OTA signaling), a propagation delay may be estimated as a portion of (such as half of) a timing advance (TA). A TA may refer to or be understood as an offset, at a UE 115, between a start of a received downlink subframe and a transmitted uplink subframe. As such, if communicating devices (such as a UE 115 and one or more components of a BS 105) are uncertain of or lack awareness to a propagation delay between the communicating devices, the propagation delay may disrupt a time synchronicity between the communicating devices. For example, due to a propagation delay, a receiving device may receive one or more messages at a different time than expected, which may result in the receiving device being unable to successfully receive and decode the one or more messages or result in a reception time of the one or more messages overlapping with (and potentially interfering with) a scheduled transmission or reception of some other messaging.

To reduce the likelihood of such conflicts occurring, at least one device of two (or more) communicating devices may adjust a timing of communications to compensate for a propagation delay. For example, a device may adjust a transmission timing associated with a scheduled transmission from the device or adjust an expected reception time of a scheduled reception at the device in accordance with a known or measured propagation delay (such as in accordance with a configured TA). In some aspects, a device may make such an adjustment by modifying or updating a reference time (such as a 5G reference time) used by the device. As such, communicating devices, such as a UE 115 and one or more components of a BS 105, may measure, estimate, calculate, or otherwise determine a propagation delay and use the propagation delay to adjust a timing of communications between the communicating devices. A UE 115 or one or more components of a BS 105 may adjust a timing of communication using PDC information, which may include or refer to one or more PDC values or one or more PDC parameters. In accordance with adjusting the timing of communications (such as a 5G reference time), a UE 115 and one or more components of a BS 105 may receive messaging at expected times despite the propagation delay.

The wireless communications system 100 may support various methods for measuring, estimating, calculating, or determining a propagation delay value (such as or including a downlink propagation delay value) used to adjust a 5G reference time. As described herein, a propagation delay value may be equivalently understood or referred to as a propagation delay, PDC information, a PDC value, or a PDC parameter. For example, a device may use a TA-based procedure associated with one or more signal transmissions (such as reference signal transmissions). Such a TA-based procedure may be associated with an evaluation of which sources of timing uncertainty may be mitigated as part of satisfying a synchronicity constraint for each Uu interface (such as per Uu interface). In another example, a device may use a time difference measurement-based procedure. Such a time difference measurement-based procedure may be understood as an RTT measurement-based procedure and may be associated with multiple time difference measurements. The multiple measurements may include a first time difference corresponding to a reception time minus a transmission time (which may be denoted as an Rx-Tx time difference) at a UE 115 and a second time difference corresponding to a reception time minus a transmission time (an Rx-Tx time difference) at one or more components of a BS 105.

A UE 115 or one or more components of a BS 105, using any one or more of the various methods for measuring, estimating, calculating, or determining a propagation delay value, may provide PDC information to one or more devices on a per-device basis. For example, one or more components of a BS 105 may provide PDC information to one or more UEs 115 on a per-UE basis. In such examples, one or more components of a BS 105 may measure, estimate, calculate, or determine potentially unique PDC information for each UE 115 of a number of UEs 115 served by one or more components of the BS 105 and may independently transmit an indication of PDC information to each UE 115 of the number of UEs 115. Such a UE-specific PDC procedure may provide UE-specific compensation at the cost of increased overhead. In some deployment scenarios, such as scenarios including a relatively large quantity of UEs 115 or UEs 115 that are located relatively close together, however, the overhead associated with UE-specific compensation may detract from overall system efficiency and adversely impact an achievable throughput. In such scenarios, for example, the increased overhead associated with UE-specific compensation may outweigh any benefits resulting from the greater level of granularity associated with UE-specific compensation.

In some implementations, one or more components of a BS 105 and a group of UEs 115 may support a group-based PDC procedure according to which the one or more components of the BS 105 may provide each UE 115 of the group of UEs 115 with group-common or group-based PDC information. In other words, the one or more components of the BS 105 may transmit PDC information to the group of UEs 115 (such that each UE 115 of the group of UEs 115 receives same PDC information) instead of transmitting PDC information separately for each UE 115. In some implementations, one or more components of the BS 105 or a UE 115 may select, ascertain, or determine whether to participate in a group-based PDC procedure or in a UE-specific PDC procedure in accordance with a channel condition or a timing constraint at the UE 115. One or more UEs 115 of the group of UEs 115 or one or more components of the BS 105 may form the group of UEs 115 (such that each UE 115 in the group of UEs 115 is to receive the group-based PDC information) in various ways and one or more components of the BS 105 may indicate the group-based PDC information to the UEs 115 of the group of UEs 115 in various ways described herein. Further, UEs 115 of the group of UEs 115 may exchange information with one or more components of the BS 105 and the one or more components of the BS 105 may use the information to calculate, measure, or otherwise determine the group-based PDC information in various ways described herein.

Figure 2:
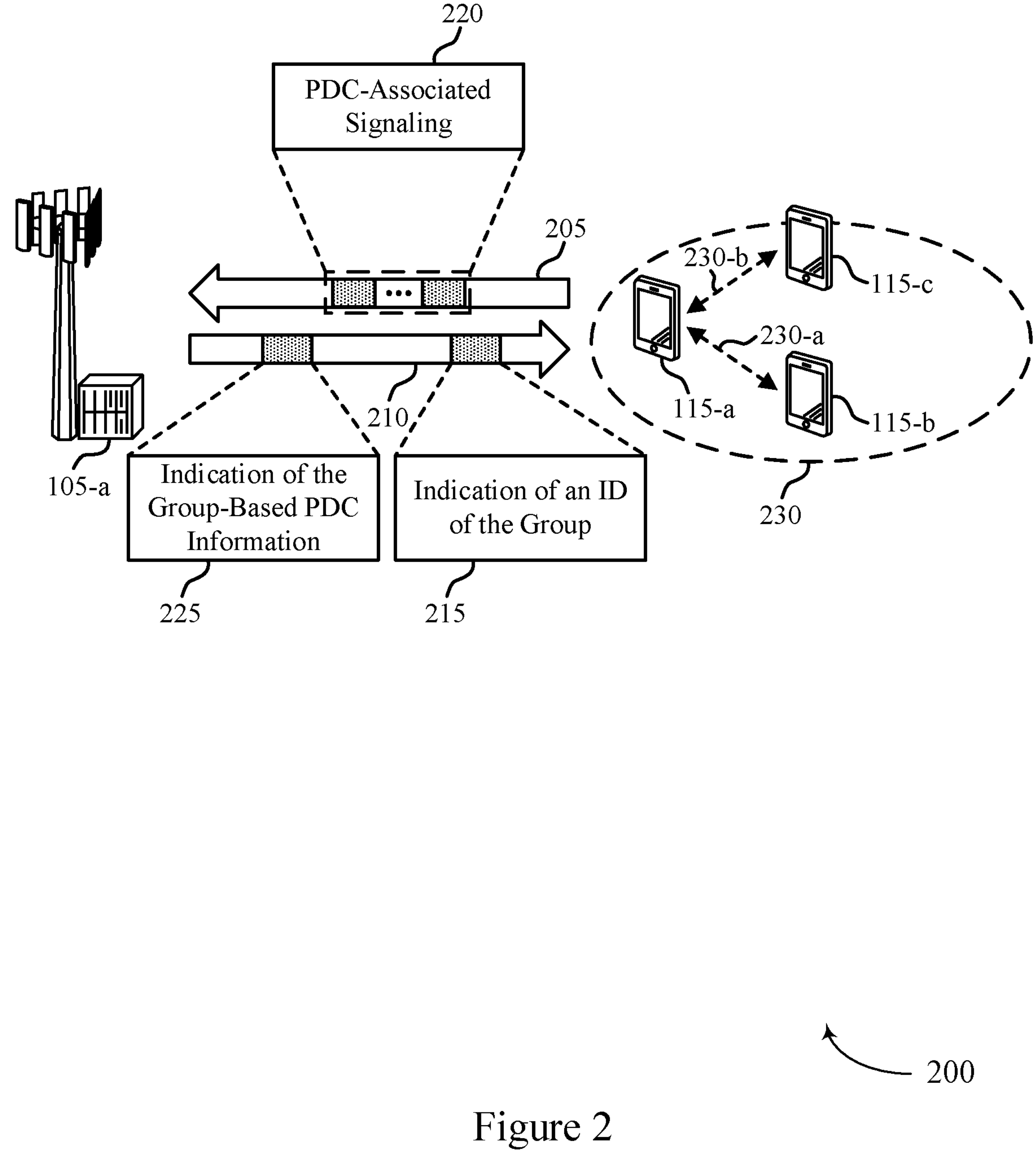
FIG. 2 shows an example signaling diagram that supports techniques for PDC.

FIG. 2 shows an example signaling diagram 200 that supports techniques for PDC. The signaling diagram 200 may implement or be implemented to realize aspects of the wireless communications system 100. For example, the signaling diagram 200 may include a group of UEs 115, including a UE 115-*a*, a UE 115-*b*, and a UE 115-*c* for purpose of example, and one or more components of a BS 105-*a*. The UE 115-*a*, the UE 115-*b*, and the UE 115-*c* may be examples of UEs 115 as illustrated by and described with reference to FIG. 1. One or more components of the BS 105-*a* may be examples of one or more components of a BS 105 as illustrated by and described with reference to FIG. 1.

The group of UEs 115 (such as the UE 115-*a*, the UE 115-*b*, and the UE 115-*c*) may participate in a group-based PDC procedure according to which one or more components of the BS 105-*a* may transmit PDC-related information to the group of UEs 115 (instead of to each UE 115 individually), which may reduce overhead costs associated with PDC. To support such a group-based PDC procedure, one or more of the UE 115-*a*, the UE 115-*b*, or and the UE 115-*c* or one or more components of the BS 105-*a* may form the group of UEs 115 such that each UE 115 in the group of UEs 115 is able to suitably use group-based PDC information (instead of, for example, UE-specific PDC information). In other words, which UEs 115 are included in a group of UEs 115 may depend on which UEs 115 can suitably use group-based PDC information associated with that group of UEs 115. Such suitable use of the group-based PDC information may refer to being able to communicate reliably using the group-based PDC information.

In some implementations, the group of UEs 115 may be formed in accordance with a communication type of the UEs 115 in the group of UEs 115. In some aspects, a communication type may include a communication scenario in which a set of UEs 115 of the group of UEs 115 are commonly connected (via a wireless communication link) to a center UE 115 or node of the group of UEs 115. For example, the UE 115-*a* may be an example of a center UE 115 or node and the UE 115-*b* and the UE 115-*c* may be included in the group of UEs 115 if they have a connection with the UE 115-*a*. As shown in FIG. 2, the UE 115-*b* may be included in the group of UEs 115 in accordance with having a sidelink 230-*a* between the UE 115-*b* and the UE 115-*a*. Similarly, the UE 115-*c* may be included in the group of UEs 115 in accordance with having a sidelink 230-*b* between the UE 115-*c* and the UE 115-*a*.

Additionally, or alternatively, one or more components of the BS 105-*a* or the UE 115-*a* may define a threshold usable to determine whether a connected device is able to group with the UE 115-*a* (for the purpose of receiving group-based PDC information). For example, one or more components of the BS 105-*a* or the UE 115-*a* may define a threshold distance and may use the threshold distance to include one or both of the UE 115-*b* and the UE 115-*c* in the group or to exclude one or both of the UE 115-*b* and the UE 115-*c* from the group. For instance, in addition to, or as an alternative to, having an established link with the UE 115-*a*, the UE 115-*b* may be included in the group if a distance between the UE 115-*b* and the UE 115-*a* satisfies (such as is less than) the threshold distance. Similarly, the UE 115-*c* may be included in the group if a distance between the UE 115-*c* and the UE 115-*a* satisfies (such as is less than) the threshold distance.

In such implementations in which the group of UEs 115 is formed in accordance with a communication type of the UE 115-*a*, the UE 115-*b*, and the UE 115-*c*, one or more components of the BS 105-*a* may directly indicate a group-based PDC-related configuration to each member of the group (such as to each of the UE 115-*a*, the UE 115-*b*, and the UE 115-*c*) to form the group of UEs 115. For example, one or more components of the BS 105-*a* may have knowledge of locations of each of the UEs 115 or of a topology associated with the UEs 115. Additionally, or alternatively, one or more of the UE 115-*a*, the UE 115-*b*, or the UE 115-*c* may transmit messaging to one or more components of the BS 105-*a* to indicate the grouping of the UE 115-*a*, the UE 115-*b*, and the UE 115-*c* in accordance with their communication type(s).

Additionally, or alternatively, the group of UEs 115 may be formed in accordance with information relating to sidelink quality. In some implementations, for example, the UE 115-*a*, the UE 115-*b*, and the UE 115-*c* may re-use a sidelink group (such as a group formed for sidelink communication) for group-based PDC information. For example, users (such as UEs 115) that are located in a same geographic area 230 associated with a same zone ID may be part of the group of UEs 115 for the purpose of group-based PDC information. As shown in FIG. 2, the UE 115-*a*, the UE 115-*b*, and the UE 115-*c* may be part of the group of UEs 115 for group-based PDC information in accordance with commonly being located within the geographic area 230.

Additionally, or alternatively, one or more UEs 115 or one or more components of the BS 105-*a* may form the group in accordance with one or more channel measurements (such as sidelink channel measurements). For example, the UE 115-*a* or the UE 115-*b* may measure a channel quality associated with the sidelink 230-*a* and, if the measured channel quality satisfies (such as is greater than) a threshold channel quality, the UE 115-*a* and the UE 115-*b* may be part of the group of UEs 115 for group-based PDC information. Similarly, the UE 115-*a* or the UE 115-*c* may measure a channel quality associated with the sidelink 230-*b* and, if the measured channel quality satisfies (such as is greater than) a threshold channel quality, the UE 115-*a* and the UE 115-*c* may be part of the group of UEs 115 for group-based PDC information. As such, within a same group for group-based PDC information, a channel quality (such as a reference signal receive power (RSRP) or pathloss) measurement of members in the group may commonly satisfy (such as be greater than) the threshold channel quality.

In such implementations in which membership into the group of UEs 115 for group-based PDC information is associated with a sidelink quality, one or more of the UE 115-*a*, the UE 115-*b*, and the UE 115-*c* or one or more components of the BS 105-*a* may form the group (such as, for example, via a signaling exchange indicating which UEs 115 are in the group of UEs 115). In implementations in which the UE 115-*a* forms the group, the UE 115-*a* may receive, from the UE 115-*b* and the UE 115-*c*, one or more sidelink channel measurement reports indicating that each of the UE 115-*b* and the UE 115-*c* are associated with sidelink channel measurements that satisfy the threshold channel quality. The UE 115-*a* may transmit, to one or more components of the BS 105-*a*, an indication that the UE 115-*b* and the UE 115-*c* are part of the group of UEs 115 in accordance with the UE 115-*b* and the UE 115-*c* being associated with sidelink channel measurements that satisfy the threshold channel quality.

In accordance with the formation of the group of UEs 115 for group-based PDC information, one or more components of the BS 105-*a* may transmit, to the UEs 115 of the group of UEs 115, an indication of an ID of the group 215. One or more components of the BS 105-*a* may transmit the indication of the ID of the group 215 via control signaling, such as via RRC signaling, a MAC control element (MAC-CE), downlink control information (DCI), or any combination thereof. In some aspects, the ID of the group of UEs 115 may be an RNTI that is unique or dedicated to the group of UEs 115 for group-based PDC information. Additional details relating to such an ID of the group of UEs 115 are illustrated by and described with reference to FIG. 3.

To support group-based PDC, one or more components of the BS 105-*a* and at least one UE 115 of the group of UEs 115 may exchange some PDC-associated signaling 220. In some aspects, a content of the PDC-associating signaling 220 may depend on whether the group-based PDC procedure involves an RTT-based PDC procedure or a TA-based PDC procedure and on which UEs 115 of the group of UEs 115 perform a propagation delay measurement or transmit signaling associated with a propagation delay measurement.

In implementations in which the group-based PDC procedure involves or is otherwise associated with an RTT-based PDC procedure (such as involves or is associated with one or more RTT measurements), the PDC-associated signaling 220 may include one or more RTT measurements and a quantity of the RTT measurements included in the PDC-associated signaling 220 may depend on which UEs 115 of the group of UEs 115 perform an RTT measurement. In some implementations, one UE 115 of the group of UEs 115 may perform an RTT measurement as part of the group-based PDC procedure. For example, each group may have a group leader and the group leader may exclusively perform an RTT measurement. For instance, the UE 115-*a* may be a group leader of the group including the UE 115-*a*, the UE 115-*b*, and the UE 115-*c* and, as such, the UE 115-*a* may perform an RTT measurement and the UE 115-*b* and the UE 115-*c* may refrain from performing RTT measurements. In such implementations in which the UE 115-*a* performs the RTT measurement, the UE 115-*a* may transmit a PDC report including an indication of the RTT measurement to one or more components of the BS 105-*a* (such that the PDC-associated signaling 220 includes the PDC report from the UE 115-*a*). Such a PDC report may include a difference between a reception time and a transmission time, as illustrated by and described in more detail with reference to FIG. 4. Further, although described as one UE 115-*a* performing and reporting an RTT measurement as a single group leader, a select subset of UEs 115 of the group of UEs 115 may perform and report RTT measurements as multiple group leaders.

In some other implementations, each UE 115 of the group of UEs 115 may perform an RTT measurement in turn as part of the group-based PDC procedure. For example, each UE 115 of the group of UEs 115 may perform an RTT measurement in accordance with a configured order (which may be pre-configured or signaled, such as signaled from one or more components of the BS 105-*a*) and may transmit a PDC report including an indication of the RTT measurement in accordance with a configured order (which may be pre-configured or signaled, such as signaled from one or more components of the BS 105-*a*). In such implementations, the UE 115-*a* may perform a first RTT measurement and transmit a first PDC report including an indication of the first RTT measurement during a first occasion, the UE 115-*b* may perform a second RTT measurement and transmit a second PDC report including an indication of the second RTT measurement during a second occasion, and the UE 115-*c* may perform a third RTT measurement and transmit a third PDC report including an indication of the third RTT measurement during a third occasion. As such, each UE 115 of the group of UEs 115 may perform separate RTT measurements but may do so in coordination with each other. In such implementations, the PDC-associated signaling 220 may include the first PDC report, the second PDC report, and the third PDC report.

In some other implementations, each UE 115 of the group of UEs 115 may perform an RTT measurement individually as part of the group-based PDC procedure. For example, each UE 115 of the group of UEs 115 may perform an RTT measurement without coordination with others of the group of UEs 115 and may transmit a PDC report without coordination with others of the group of UEs 115. For instance, the UE 115-*a* may individually or independently perform a first RTT measurement and transmit a first PDC report including an indication of the first RTT measurement, the UE 115-*b* may individually or independently perform a second RTT measurement and transmit a second PDC report including an indication of the second RTT measurement, and the UE 115-*c* may individually or independently perform a third RTT measurement and transmit a third PDC report including an indication of the third RTT measurement. In such implementations, the PDC-associated signaling 220 may include the first PDC report, the second PDC report, and the third PDC report.

In implementations in which the group-based PDC procedure involves or is otherwise associated with a TA-based PDC procedure, the PDC-associated signaling 220 may include one or more reference signal transmissions (such as SRS transmissions) from one or more UEs 115 of the group of UEs 115 and a quantity of the reference signal transmissions included in the PDC-associated signaling 220 may depend on which UEs 115 of the group of UEs 115 perform a reference signal transmission. In some implementations, one UE 115 of the group of UEs 115 may perform a reference signal transmission as part of the group-based PDC procedure. For example, each group may have a group leader and the group leader may exclusively perform a reference signal transmission. For instance, the UE 115-*a* may be a group leader of the group including the UE 115-*a*, the UE 115-*b*, and the UE 115-*c* and, as such, the UE 115-*a* may perform an SRS transmission and the UE 115-*b* and the UE 115-*c* may refrain from performing SRS transmissions. Further, although described as one UE 115-*a* performing an SRS transmission as a single group leader, a select subset of UEs 115 of the group of UEs 115 may perform SRS transmissions as multiple group leaders.

In some other implementations, each UE 115 of the group of UEs 115 may perform a reference signal transmission in turn as part of the group-based PDC procedure. For example, each UE 115 of the group of UEs 115 may perform a reference signal transmission in accordance with a configured order (which may be pre-configured or signaled, such as signaled from one or more components of the BS 105-*a*). For instance, the UE 115-*a* may perform a first SRS transmission during a first occasion, the UE 115-*b* may perform a second SRS transmission during a second occasion, and the UE 115-*c* may perform a third SRS transmission during a third occasion. As such, each UE 115 of the group of UEs 115 may perform separate SRS transmissions but may do so in coordination with each other. In such implementations, the PDC-associated signaling 220 may include the first SRS transmission, the second SRS transmission, and the third SRS transmission.

In some other implementations, each UE 115 of the group of UEs 115 may perform a reference signal transmission individually as part of the group-based PDC procedure. For example, each UE 115 of the group of UEs 115 may perform a reference signal transmission without coordination with others of the group of UEs 115. For instance, the UE 115-*a* may individually or independently perform a first SRS transmission, the UE 115-*b* may individually or independently perform a second SRS transmission, and the UE 115-*c* may individually or independently perform a third SRS transmission. In such implementations, the PDC-associated signaling 220 may include the first SRS transmission, the second SRS transmission, and the third SRS transmission.

One or more components of the BS 105-*a*, in accordance with receiving the PDC-associated signaling 220, may generate, calculate, measure, or otherwise determine the group-based PDC information. For example, one or more components of the BS 105-*a*, may use the one or more PDC reports or the one or more SRS transmissions included in the PDC-associated signaling 220 and determine one or more PDC values or parameters that are common for each UE 115 of the group of UEs 115. In other words, one or more components of the BS 105-*a* may aggregate the PDC-associated signaling 220 received from one or more UEs 115 of the group of UEs 115 and generate PDC information associated with the aggregated PDC-associated signaling 220 (such that one or more components of the BS 105-*a* may generate the group-based PDC information in view of propagation delay measurements from each of the one or more UEs 115 of the group of UEs 115 that provide PDC-associated signaling 220 to one or more components of the BS 105-*a*).

In some aspects, one or more components of the BS 105-*a* may groupcast an indication of the group-based PDC information 225 to the group of UEs 115. Further, a content of the group-based PDC information that one or more components of the BS 105-*a* groupcasts to the group of UEs 115 may depend on whether the group-based PDC procedure involves an RTT-based PDC procedure or a TA-based PDC procedure. In implementations in which the group-based PDC procedure involves an RTT-based PDC procedure, one or more components of the BS 105-*a* may groupcast a difference between a reception time and a transmission time for UE-based compensation (such that a UE 115 adjusts a transmission timing on its end) or may groupcast a propagation delay value for BS-based compensation (such that one or more components of the BS 105-*a* adjusts a transmission timing on its end). In implementations in which the group-based PDC procedure involves a TA-based PDC procedure, one or more components of the BS 105-*a* may groupcast a TA command and the UEs 115 of the group of UEs 115 may use the TA command to adjust a transmission timing on their end.

In some implementations, the UEs 115 of the group of UEs 115 may receive and decode the indication of the group-based PDC information 225 in accordance with the ID of the group of UEs 115 (such as in accordance with the RNTI corresponding to the group of UEs 115). Additional details relating to such use of the ID of the group of UEs 115 to receive and decode the indication of the group-based PDC information are illustrated and described with reference to FIG. 3. As such, each UE 115 of the group of UEs 115 may receive the indication of the group-based PDC information 225 and use the group-based PDC information to adjust a timing of communications between that UE 115 and one or more components of the BS 105-*a*.

Although the group of UEs 115 is shown and described as including the UE 115-*a*, the UE 115-*b*, and the UE 115-*c*, the group of UEs 115 may include any quantity of UEs 115. Further, although signaling from the group of UEs 115 to one or more components of the BS 105-*a* is shown via a communication link 205, the communication link 205 may represent one or multiple communication links 205 between one or more components of the BS 105-*a* and the group of UEs 115 (such that each UE 115 may have a separate communication link 205 between that UE 115 and one or more components of the BS 105-*a*). Similarly, although signaling from one or more components of the BS 105-*a* to the group of UEs 115 is shown via a communication link 210, the communication link 210 may represent one or more multiple communication links 210 between one or more components of the BS 105-*a* and the group of UEs 115 (such that each UE 115 may have a separate communication link 210 between that UE 115 and one or more components of the BS 105-*a*).

Figure 3:
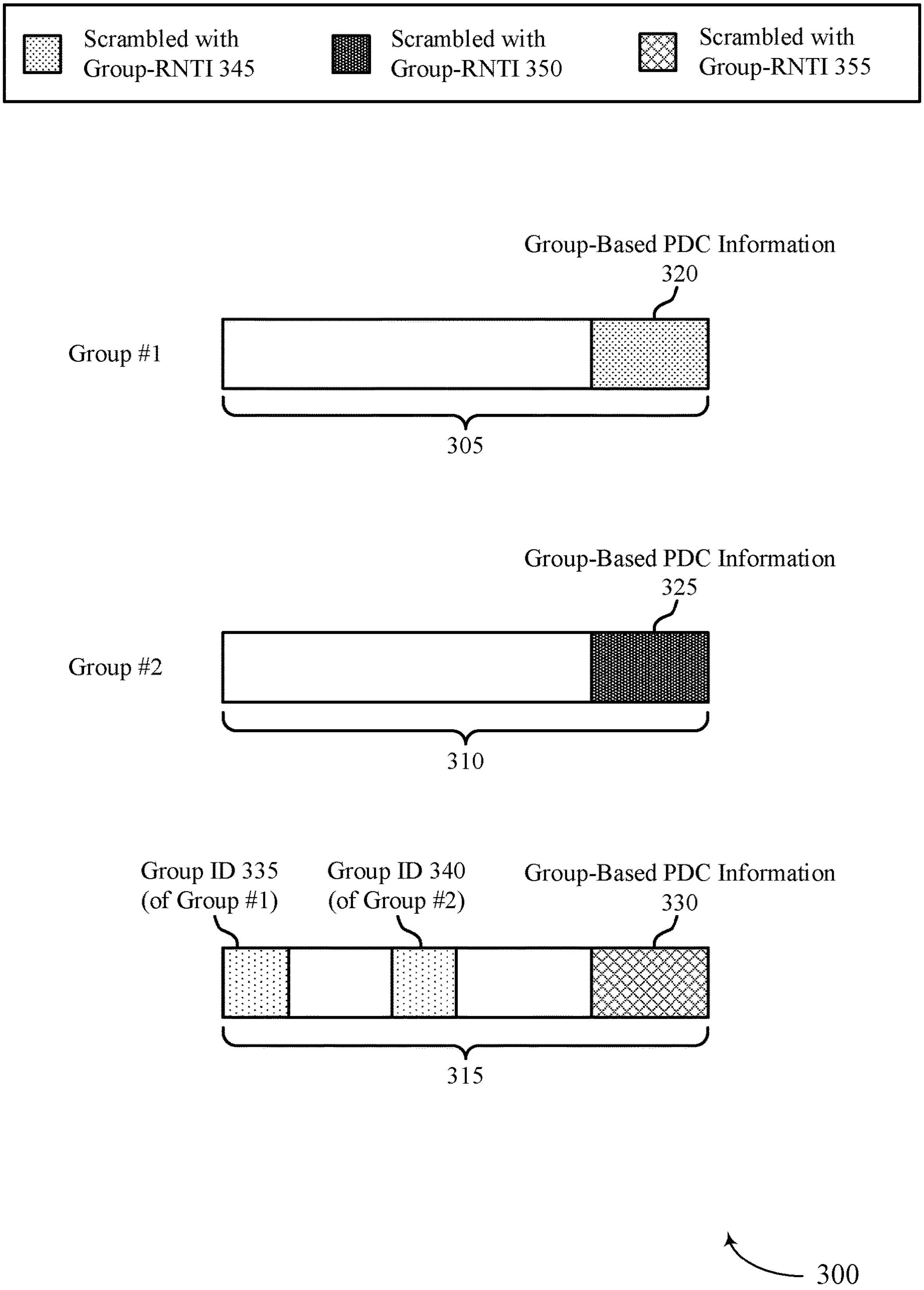
FIG. 3 shows example messaging formats that support techniques for PDC.

FIG. 3 shows example messaging formats 300 that support techniques for PDC. The messaging formats 300 may implement or be implemented to realize aspects of the wireless communications system 100 or the signaling diagram 200. For example, one or more components of a BS 105 may transmit group-based PDC information via one or more messages to one or more groups of UEs 115 in accordance with one or more of the messaging formats 300. Such one or more components of a BS 105 may be an example of one or more components of a BS 105, such as one or more components of the BS 105-*a*, as illustrated by and described with reference to FIGS. 1 and 2. Such UEs 115 may be examples of UEs 115, such as the UE 115-*a*, the UE 115-*b*, and the UE 115-*c*, as illustrated by and described with reference to FIGS. 1 and 2.

One or more components of the BS 105 may transmit group-based PDC information to one or more groups of UEs 115 via groupcast or broadcast messaging, such as periodic broadcast or groupcast messaging. In some aspects, one or more components of the BS 105 may transmit the periodic broadcast or groupcast messaging including the group-based PDC information using a physical downlink shared channel (PDSCH), such as a common group PDSCH (which may be equivalently referred to as a group-common PDSCH). One or more components of the BS 105 may use an ID of a group of UEs 115, such as an RNTI associated with the group of UEs 115, to support successful reception and decoding of group-based PDC information by UEs 115 of an intended group of UEs 115.

In some implementations, for example, one or more components of the BS 105 may assign or configure a group-RNTI for each group of UEs 115 (such as for each group of UEs 115 associated with group-based PDC). In such implementations, one or more components of the BS 105 may assign or configure a group-RNTI 345 for a first group of UEs 115 (such as a group #1) and may scramble a message 305 (or at least a portion of the message 305) using the group-RNTI 345, the message 305 including group-based PDC information 320 that is intended for UEs 115 of the first group of UEs 115. As such, UEs 115 of the first group of UEs 115 may be able to receive and decode (such as de-scramble) the message 305 (or the portion of the message 305) including the group-based PDC information 320 and may use the group-based PDC information 320 accordingly. Further, in accordance with the group-based DPC information 320 being scrambled with the group-RNTI 345 that is assigned or configured for the first group of UEs 115, UEs 115 outside of the first group of UEs 115 (such as UEs 115 of a second group of UEs 115 or UEs 115 that are unaffiliated with a group) may be unable to decode (such as de-scramble) the group-based PDC information 320.

Similarly, one or more components of the BS 105 may assign or configure a group-RNTI 350 for a second group of UEs 115 (such as a group #2) and may scramble a message 310 (or at least a portion of the message 310) using the group-RNTI 350, the message 310 including group-based PDC information 325 that is intended for UEs 115 of the second group of UEs 115. As such, UEs 115 of the second group of UEs 115 may be able to receive and decode (such as de-scramble) the message 310 (or the portion of the message 310) including the group-based PDC information 325 and may use the group-based PDC information 325 accordingly. Further, in accordance with the group-based DPC information 325 being scrambled with the group-RNTI 350 that is assigned or configured for the second group of UEs 115, UEs 115 outside of the second group of UEs 115 (such as UEs 115 of the first group of UEs 115 or UEs 115 that are unaffiliated with a group) may be unable to decode (such as de-scramble) the group-based PDC information 325.

In some other implementations, one or more components of the BS 105 may assign or configure a single (such as same) group-RNTI 355 for group-based PDC such that UEs 115 of various groups of UEs 115 may receive an indication of the group-RNTI 355. For example, one or more components of the BS 105 may assign or configure the group-RNTI 355 for UEs 115 of the first group of UEs 115 (such as the group #1) and for UEs 115 of the second group of UEs 115 (such as the group #2) and may scramble a message 315 (or a portion of the message 315) using the group-RNTI 355. As such, UEs 115 of the first group of UEs 115 and UEs 115 of the second group of UEs 115 (and any other group of UEs 115 formed for group-based PDC) may be able to receive and decode (such as de-scramble) the message 315 (or the portion of the message 315) including group-based PDC information 330, but UEs 115 unaffiliated with a group may be unable to decode (such as de-scramble) the group-based PDC information 330. In some aspects, the message 315 may include the group-based PDC information 330 that is intended for one of the first group of UEs 115 or the second group of UEs 115 and one or more components of the BS 105 may indicate for which group of UEs 115 the group-based PDC information 330 is intended via an additional group ID that one or more components of the BS 105 assigns or configures for each group of UEs 115.

For example, one or more components of the BS 105 may assign or configure a group ID 335 for the first group of UEs 115 and a group ID 340 for the second group of UEs 115 and may include one of the group ID 335 or the group ID 340 in the message 315 (such as in a content of the group common PDSCH) to indicate for which group of UEs 115 the group-based PDC information 330 is intended. If UEs 115 receiving the message 315 detect that the group ID 335 is included in the message 315, such UEs 115 may assume that the group-based PDC information 330 is intended for the first group of UEs 115. Alternatively, if UEs 115 receiving the message 315 detect that the group ID 340 is included in the message 315, such UEs 115 may assume that the group-based PDC information 330 is intended for the second group of UEs 115. If UEs 115 receiving the message 315 detect that both the group ID 335 and the group ID 340 are included in the message 315, such UEs 115 may assume that the group-based PDC information is for both the first group of UEs 115 and the second group of UEs 115. Further, in some implementations, a UE 115 may provide PDC information to one or more components of a BS 105. In such implementations, the UE 115 may provide the PDC information to one or more components of the BS 105 via a MAC-CE.

Figure 4:
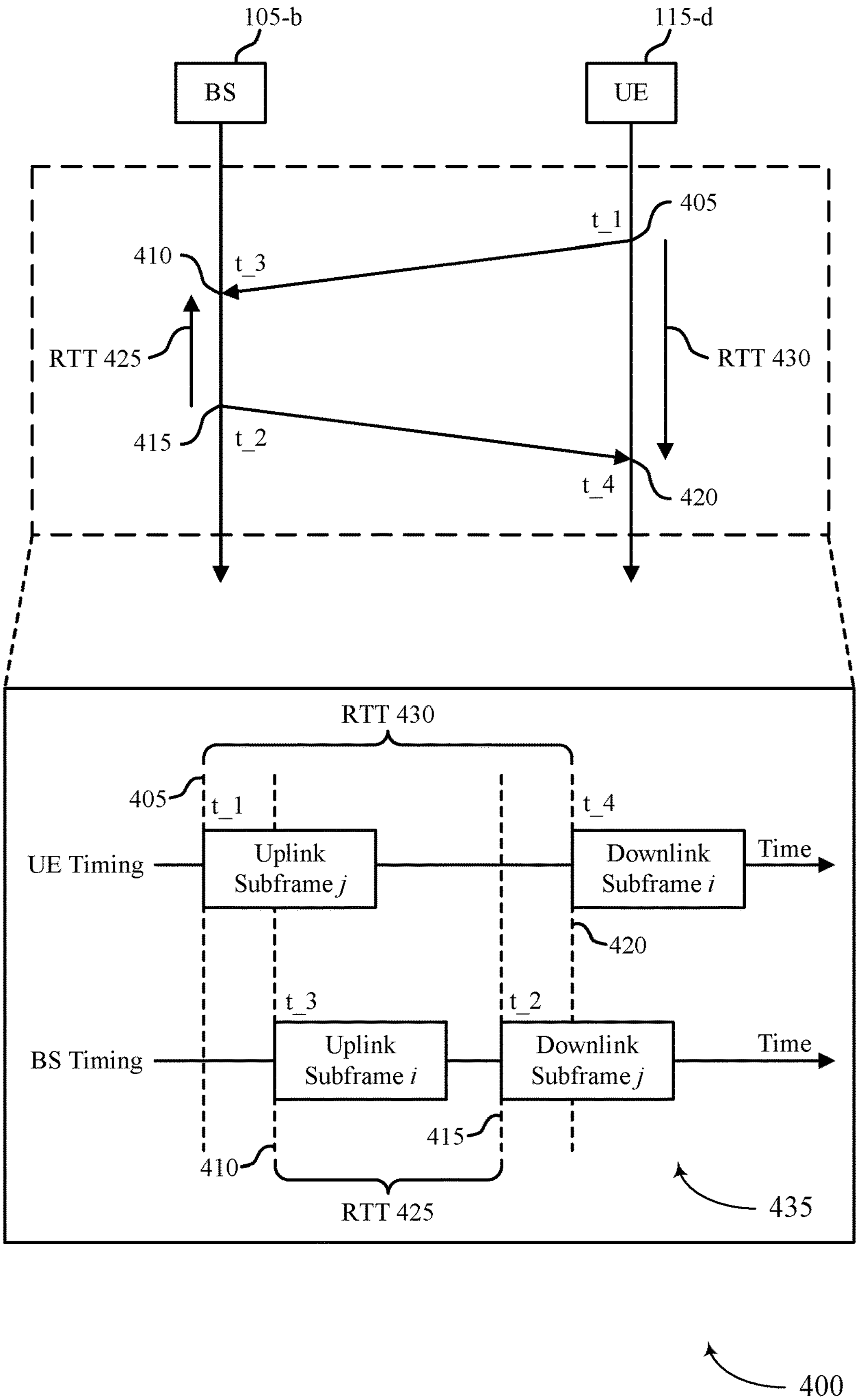
FIG. 4 shows an example propagation delay measurement procedure that supports techniques for PDC.

FIG. 4 shows an example propagation delay measurement procedure 400 that supports techniques for PDC. The propagation delay measurement procedure 400 may implement or be implemented to realize aspects of the wireless communications system 100, the signaling diagram 200, or the messaging formats 300. For example, one or more components of a BS 105-*b* or a UE 115-*d*, or both, may perform the propagation delay measurement procedure 400 in accordance with an RTT-based PDC procedure. One or more components of the BS 105-*b* may be an example of one or more components of a BS 105, such as one or more components of a BS 105-*a*, as illustrated by or described with reference to FIGS. 1-3. The UE 115-*d* may be an example of a UE 115, such as a UE 115-*a*, a UE 115-*b*, or a UE 115-*c*, as illustrated by or described with reference to FIGS. 1-3.

In some implementations, one or more components of the BS 105-*b* or the UE 115-*d*, or both, may perform aspects of the propagation delay measurement procedure 400 to generate, measure, calculate, or otherwise determine time differences associated with an RTT between one or more components of the BS 105-*b* and the UE 115-*d*. For example, in accordance with the propagation delay measurement procedure 400, the UE 115-*d* may determine a value for a downlink propagation delay. In the context of the propagation delay measurement procedure 400, subframes may be indexed separately at one or more components of the BS 105-*b* and the UE 115-*d*. As such, for example, a subframe #i at one or more components of the BS 105-*b* may be different than a subframe #i at the UE 115-*d*. Similarly, a subframe #j at one or more components of the BS 105-*b* may be different than a subframe #j at the UE 115-*d*. For example, and as shown by a timeline 435, an uplink subframe #j and a downlink subframe #i at the UE 115-*d* may or may not align in time with a downlink subframe #j and an uplink subframe #i, respectively, at the BS 105-*b*.

At 405, the UE 115-*d* may transmit one or more messages during an uplink subframe #j (as defined at the UE 115-*d*). For example, the UE 115-*d* may transmit one or more reference signals, such as SRSs, during the uplink subframe #j at 405. In some aspects, $t_1$ may be a transmission timing of the uplink subframe #j and the uplink subframe #j may be an uplink subframe which is closest in time to a subframe #i (defined at the UE 115-*d*).

At 410, one or more components of the BS 105-*b* may receive the one or more messages sent from the UE 115-*d* at 405 during an uplink subframe #i (as defined at one or more components of the BS 105-*b*). For example, one or more components of the BS 105-*b* may receive one or more reference signals, such as SRSs, associated with the UE 115-*d* that are suitable (such as that are associated with a signal quality or strength that satisfies a threshold signal quality or strength). In other words, $t_3$ may be a reception timing of the uplink subframe #i including a suitable SRS associated with the UE 115-*d* and may be defined by a first or initial detected path in time at one or more components of the BS 105-*b*.

At 415, one or more components of the BS 105-*b* may transmit one or more messages during a downlink subframe #j (as defined at one or more components of the BS 105-*b*). In some aspects, $t_2$ may be a transmission timing of the downlink subframe #j which is closest in time to the uplink subframe #i (defined at one or more components of the BS 105-*b*) received from the UE 115-*d*.

At 420, the UE 115-*d* may receive the one or more messages transmitted from one or more components of the BS 105-*b* during a downlink subframe #i (as defined at the UE 115-*d*). In some aspects, $t_4$ may be a reception timing of the downlink subframe #i and may be defined by a first or initial detected path in time at the UE 115-*d*.

In view of such signaling, the UE 115-*d* may calculate or measure a time difference between a reception time and a transmission time (which may be referred to as an Rx-Tx time difference) in accordance with a result of $t_4$-$t_1$. Such a time difference at the UE 115-*d* may be an RTT 430. Similarly, one or more components of the BS 105-*b* may calculate or measure a time difference between a reception time and a transmission time (which may be referred to as an Rx-Tx time difference) in accordance with a result of $t_3$-$t_2$. Such a time difference at one or more components of the BS 105-*b* may be an RTT 425.

In accordance with the implementations disclosed herein, the UE 115-*d* may belong to a group of UEs 115 associated with group-based PDC. The UE 115-*d* may provide an indication of the RTT 430 (such as, for example, via PDC-associated signaling 220) in accordance with the UE 115-*d* being a group leader of the group of UEs 115, in accordance with each UE 115 of the group of UEs 115 reporting RTT measurements in turn, or in accordance with each UE 115 of the group of UEs 115 reporting RTT measurements individually. One or more components of the BS 105-*b* may transmit (such as via groupcast signaling) a message including an indication of group-based PDC information associated with the RTT 430 reported by the UE 115-*d* (and additionally associated with any other RTT measurements reported by any other UEs 115 of the group of UEs 115) and may scramble the message (or at least a portion of the message including the group-based PDC information) using an ID associated with the group of UEs 115. The UE 115-*d* may receive and decode the message (or at least the portion of the message including the group-based PDC information) using the ID associated with the group of UEs 115.

Figure 5:
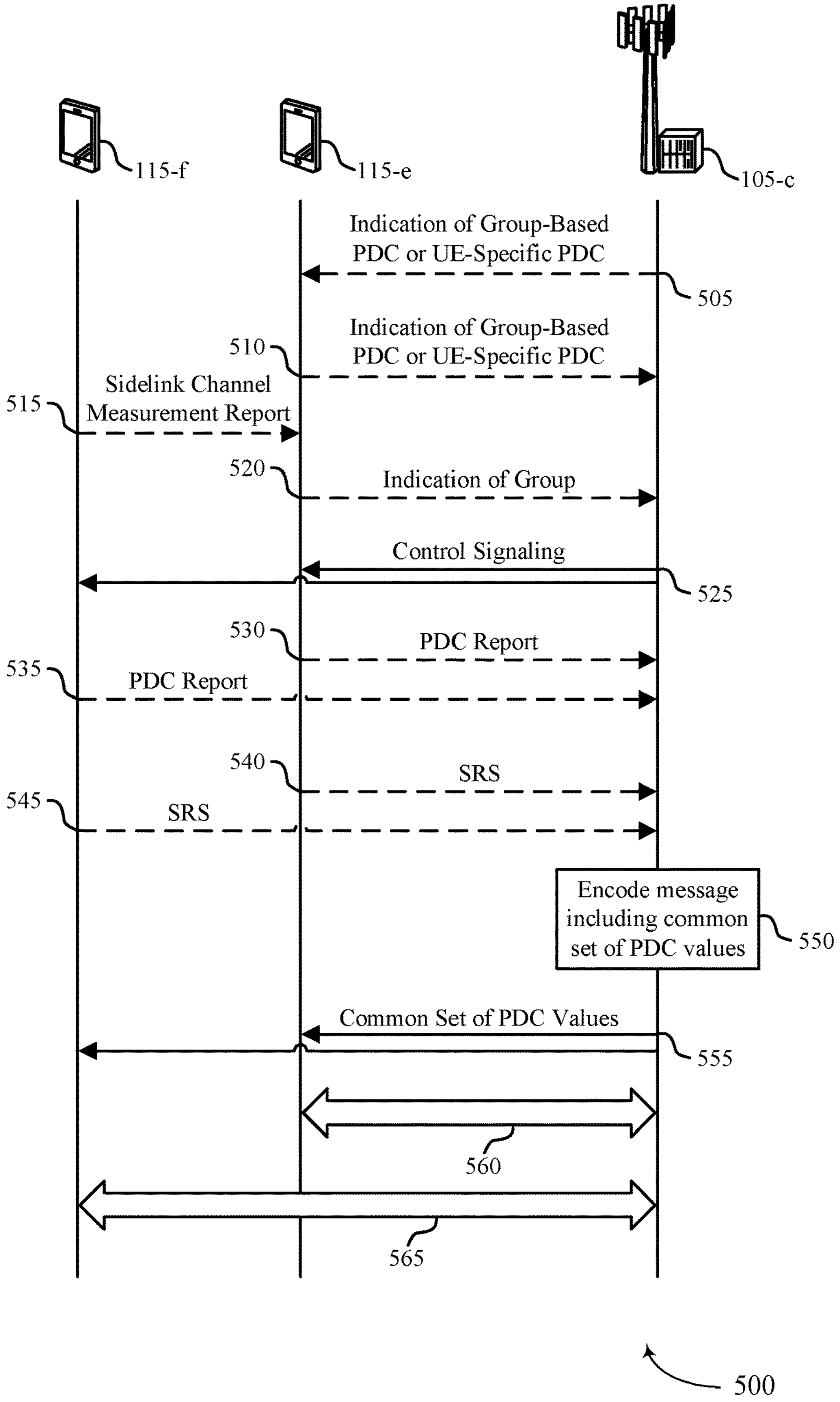
FIG. 5 shows an example process flow that supports techniques for PDC.

FIG. 5 shows an example process flow 500 that supports techniques for PDC. The process flow 500 may implement or be implemented to realize aspects of the wireless communications system 100, the signaling diagram 200, the messaging formats 300, or the propagation delay measurement procedure 400. For example, the process flow 500 illustrates communication between a UE 115-*e*, a UE 115-*f*, and one or more components of a BS 105-*c*. The UE 115-*e* and the UE 115-*f* may be examples of UEs 115, such as the UE 115-*a*, the UE 115-*b*, the UE 115-*c*, or the UE 115-*d*, as illustrated by or described with reference to FIGS. 1-4. One or more components of the BS 105-*c* may be an example of one or more components of a BS 105, such as one or more components of the BS 105-*a* or one or more components of the BS 105-*b*, as illustrated by or described with reference to FIGS. 1-4. Further, one or more components of the BS 105-*c* may be referred to herein as a network entity.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the UE 115-*e* may receive, from one or more components of the BS 105-*c*, an indication associated with a selection between a group-based PDC procedure and a UE-specific PDC procedure. For example, group-based PDC may fail to satisfy or may be otherwise unsuitable to some UEs 115, such as UEs 115 associated with a relatively high accuracy constraint for PDC, and one or more components of the BS 105-*c* may support such UEs 115 in accordance with configuring UEs 115 to participate in a group-based PDC procedure or a UE-specific PDC procedure and signaling which procedure to use via additional signaling.

One or more components of the BS 105-*c* may transmit one or more parameters (such as RRC parameters) to support an indication of whether UE-specific PDC is enabled (or activated) or whether group-based PDC is enabled (or activated), or both, for the UE 115-*e*. For example, one or more components of the BS 105-*c* may transmit an indication of a UEspecifiedPDCwithPeriodic parameter, a UEspecifiedPDCwithAperiodic parameter, or a UEspecifiedPDCwithSemipersistant parameter, or any combination thereof. Such parameters may provide information for the UE 115-*e* as to whether the UE 115-*e* is to participate in a UE-specific PDC procedure (which may be equivalently referred to as a UE-specified PDC procedure) and, if so, information associated with a frequency of a signaling exchange (such as a transmission of a PDC report) as part of the PDC procedure. For example, the one or more parameters may indicate whether the UE 115-*e*, if activated for a UE-specific PDC procedure, is to transmit PDC reports to one or more components of the BS 105-*c* periodically, aperiodically, or semi-persistently.

In some implementations, to support a proper or suitable selection between a group-based PDC procedure and a UE-specific PDC procedure, one or more components of the BS 105-*c* may transmit an indication associated with a selection between the two procedures in accordance with a UE-specific time synchronicity accuracy level or constraint (which may be referred to herein as a clock accuracy constraint). In such implementations, one or more components of the BS 105-*c* may indicate a selection of a group-based PDC procedure for the UE 115-*e* if the UE 115-*e* is associated with a relatively lower or more lenient time synchronicity accuracy level or constraint. Alternatively, one or more components of the BS 105-*c* may indicate a selection of a UE-specific PDC procedure for the UE 115-*e* if the UE 115-*e* is associated with a relatively higher or stricter time synchronicity accuracy level or constraint.

Additionally, or alternatively, and also to support a proper or suitable selection between a group-based PDC procedure and a UE-specific PDC procedure, one or more components of the BS 105-*c* may transmit an indication associated with a selection between the two procedures in accordance with an uplink traffic arriving time from the UE 115-*e*. For example, if a difference between actual uplink traffic arriving time and expected uplink traffic arriving time is larger than a threshold time gap, one or more components of the BS 105-*c* may indicate a selection of a UE-specific PDC procedure for the UE 115-*e*. Alternatively, if a difference between actual uplink traffic arriving time and expected uplink traffic arriving time is less than a threshold time gap, one or more components of the BS 105-*c* may indicate a selection of a group-based PDC procedure for the UE 115-*e*.

At 510, the UE 115-*e* may transmit an indication associated with the selection between the group-based PDC procedure and the UE-specific PDC procedure. For example, the UE 115-*e* may trigger a UE-specific PDC procedure for the UE 115-*e* in accordance with a clock accuracy constraint of the UE 115-*e*. As such, the UE 115-*e* may select to participate in a UE-specific PDC procedure if the UE 115-*e* is associated with a relatively higher or stricter time synchronicity accuracy level or constraint. Alternatively, the UE 115-*e* may select to participate in a group-based PDC procedure if the UE 115-*e* is associated with a relatively lower or more lenient time synchronicity accuracy level or constraint. In some aspects, the UE 115-*e* may transmit the indication associated with the selection to one or more components of the BS 105-*c* via a MAC-CE, uplink control information (UCI), or an SR.

In implementations in which the UE 115-*e* triggers a UE-specific PDC procedure, the UE 115-*e* may transmit, to one or more components of the BS 105-*c*, an indication of whether a PDC report associated with the UE-specific PDC procedure is periodic, aperiodic, or semi-persistent. In some aspects, the UE 115-*e* may provide such an indication of periodic, aperiodic, or semi-persistent in the trigger indication sent (such as in same messaging that includes the trigger indication or in a field of a trigger indication message) to one or more components of the BS 105-*c*. For a UE-specific PDC procedure, one or more components of the BS 105-*c* may transmit UE-specific PDC information to the UE 115-*e* via DCI (such as via a DCI format exclusively used for UE-specific PDC information) or via a MAC-CE (such as via a MAC-CE exclusively used for UE-specific PDC information).

As such, the UE 115-*e* may participate in a PDC procedure that is proper or suitable for the UE 115-*e*. Further, in some aspects, the UE 115-*a* may either receive the indication of the selection from one or more components of the BS 105-*c* at 505 or transmit the indication of the selection to one or more components of the BS 105-*c* at 510 (and not expect to perform both). In some other aspects, the UE 115-*e* may support both the reception at 505 and the selection at 510. In such aspects, the indication that the UE 115-*e* transmits to one or more components of the BS 105-*c* at 510 may serve as a confirmation or a rejection of the selection indicated by the signaling at 505. Further, although the indications associated with the selection are shown as being exchanged between the UE 115-*e* and one or more components of the BS 105-*c*, the UE 115-*f* and one or more components of the BS 105-*c* may additionally, or alternatively, exchange similar information regarding a selection for the UE 115-*f* between a group-based PDC procedure and a UE-specific PDC procedure.

At 515, the UE 115-*e* may receive, from the UE 115-*f*, one or more reports indicating that a sidelink channel measurement at the UE 115-*f* satisfies a threshold sidelink channel measurement. In such implementations in which the UE 115-*e* receives the one or more reports indicating that the sidelink channel measurement at the UE 115-*f* satisfies the threshold sidelink channel measurement, the UE 115-*e* may group with the UE 115-*f* for the purpose of receiving group-based PDC information. The UE 115-*e* and the UE 115-*f* may group together for receiving group-based PDC information (such as a common set of PDC values) for various other additional, or alternative, reasons as described in more detail with reference to FIG. 2.

At 520, the UE 115-*e* may transmit, to one or more components of the BS 105-*c*, an indication that the UE 115-*f* is part of a group of UEs 115 (including the UE 115-*e*) in accordance with the UE 115-*f* having the sidelink channel measurement that satisfies the threshold sidelink channel measurement. In some implementations, the UE 115-*e* may transmit such an indication if the UE 115-*e* receives the one or more reports from the UE 115-*f* at 515.

At 525, one or more components of the BS 105-*c* may transmit, to a group of UEs 115 including the UE 115-*e* and the UE 115-*f*, control signaling indicating an ID of the group of UEs 115 associated with the group-based PDC information (such as the common set of PDC values). Likewise, the UE 115-*e* and the UE 115-*f* may receive the control signaling indicating the ID of the group of UEs 115. In some implementations, one or more components of the BS 105-*c* may provide UEs 115 of the group of UEs 115 with the ID of the group in accordance with a communication type of the UEs 115, a geographic area or location of the UEs 115, or sidelink channel measurements of the UEs 115. In some aspects, the ID of the group of UEs 115 may be a group-RNTI value.

In some implementations, the control signaling may indicate which and how one or more UEs 115 of the group of UEs 115 are to report PDC-associated signaling. For example, the control signaling may indicate which UE 115 is a group leader or an order associated with different UEs 115 of the group of UEs 115 providing PDC-associated signaling in turn. One or more components of the BS 105-*c* may transmit the control signaling via RRC signaling (such as via one or more RRC parameters), a MAC-CE, or DCI, or any combination thereof. Further, the control signaling may include a single control signal or message or multiple control signals or messages.

At 530, the UE 115-*e* may transmit, to one or more components of the BS 105-*c*, a PDC report including an indication of an RTT measurement at the UE 115-*e*. The UE 115-*e* may perform the RTT measurement and transmit the PDC report in accordance with the UE 115-*e* being a group leader of the group of UEs 115, each UE 115 of the group of UEs 115 measuring an RTT in turn, or each UE 115 of the group of UEs 115 measuring an RTT individually.

At 535, the UE 115-*f* may transmit, to one or more components of the BS 105-*c*, a PDC report including an indication of an RTT measurement at the UE 115-*f*. The UE 115-*f* may perform the RTT measurement and transmit the PDC report in accordance with the UE 115-*f* being a group leader of the group of UEs 115, each UE 115 of the group of UEs 115 measuring an RTT in turn, or each UE 115 of the group of UEs 115 measuring an RTT individually.

At 540, the UE 115-*e* may transmit, to one or more components of the BS 105-*c*, one or more SRSs. The UE 115-*e* may transmit the one or more SRSs in accordance with the UE 115-*e* being a group leader of the group of UEs 115, each UE 115 of the group of UEs 115 transmitting one or more SRSs in turn, or each UE 115 of the group of UEs 115 transmitting one or more SRSs individually.

At 545, the UE 115-*f* may transmit, to one or more components of the BS 105-*c*, one or more SRSs. The UE 115-*f* may transmit the one or more SRSs in accordance with the UE 115-*f* being a group leader of the group of UEs 115, each UE 115 of the group of UEs 115 transmitting one or more SRSs in turn, or each UE 115 of the group of UEs 115 transmitting one or more SRSs individually.

At 550, one or more components of the BS 105-*c* may encode a message including an indication of the group-based PDC information (such as the common set of PDC values) via a scrambling of the message in accordance with the ID of the group of UEs 115. For example, one or more components of the BS 105-*c* may generate a scrambling sequence using the ID of the group of UEs 115 as an input (such as an input into a pseudo-random number generator) and may scramble the message using the scrambling sequence.

At 555, one or more components of the BS 105-*c* may transmit, to the group of UEs 115 including the UE 115-*e* and the UE 115-*f*, the group-based PDC information (such as the common set of PDC values) in accordance with the ID of the group of UEs 115 (such as in accordance with the scrambling of the message including the group-based PDC information. The UE 115-*e* and the UE 115-*f* may receive the message (which one or more components of the BS 105-*c* may groupcast or broadcast) and decode the message using the ID of the group of UEs 115. For example, the UE 115-*e* and the UE 115-*f* may generate a scrambling sequence using the ID of the group of UEs 115 as an input (such as an input into a pseudo-random number generator) and may descramble the message using the scrambling sequence.

At 560, the UE 115-*e* may communicate with one or more components of the BS 105-*c* in accordance with the group-based PDC information (such as the common set of PDC values). For example, one or both of the UE 115-*e* and one or more components of the BS 105-*c* may adjust a timing of communications (such as one or both of uplink communications and downlink communications) between the UE 115-*e* and one or more components of the BS 105-*c* using the group-based PDC information. For instance, the group-based PDC information may include a PDC value which the UE 115-*e* may use to compensate an uplink transmission time or an Rx-Tx time difference value which the UE 115-*e* may use to compute or determine a final PDC value.

At 565, the UE 115-*f* may communicate with one or more components of the BS 105-*c* in accordance with the group-based PDC information (such as the common set of PDC values). For example, one or both of the UE 115-*f* and one or more components of the BS 105-*c* may adjust a timing of communications (such as one or both of uplink communications and downlink communications) between the UE 115-*f* and one or more components of the BS 105-*c* using the group-based PDC information. For instance, the group-based PDC information may include the PDC value which the UE 115-*f* may use to compensate an uplink transmission time or an Rx-Tx time difference value which the UE 115-*f* may use to compute or determine a final PDC value.

Figure 6:
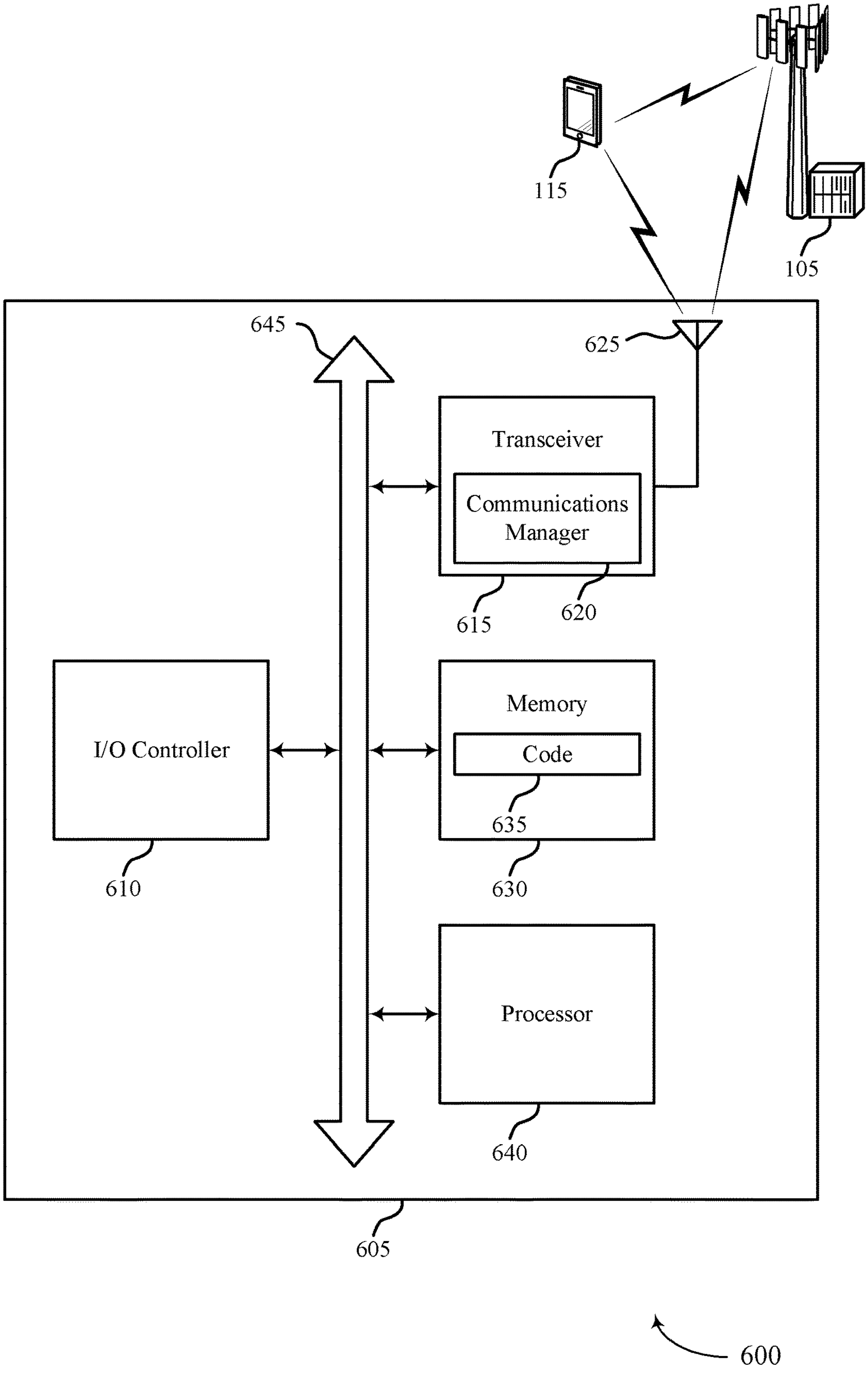
FIGS. 6 and 7 show diagrams of example devices that support techniques for PDC.

FIG. 6 shows a diagram 600 of an example device 605 that supports techniques for PDC. The device 605 may communicate wirelessly with one or more components of one or more BSs 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations associated with received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (such as the processor 640, or the memory 630, or both), may be included in a chip or chip assembly that is installed in the device 605.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a basic I/O system (BIOS) which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605 and may process information received from other components (such as inputs or signals) or output information to other components. For example, a chip or modem of the device 605 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The communications manager 620 may support wireless communication at a UE in accordance with examples as disclosed herein. For example, the communications manager 620 may be configured as or otherwise support a means for receiving, from a network entity, control signaling indicating an ID of a group of UEs associated with a common set of one or more PDC values. The communications manager 620 may be configured as or otherwise support a means for receiving, from the network entity, the common set of one or more PDC values. The communications manager 620 may be configured as or otherwise support a means for communicating with the network entity in accordance with the common set of one or more PDC values.

In some implementations, the control signaling includes an indication of the ID of the group of UEs in accordance with a communication type associated with the UE.

In some implementations, the communication type is associated with a set of UEs of the group of UEs being commonly connected to a center UE of the group of UEs. In some implementations, each UE of the set of UEs is within a threshold distance of the center UE.

In some implementations, the control signaling includes an indication of the ID of the group of UEs in accordance with the UE being located in a geographic area associated with a same zone ID as others of the group of UEs.

In some implementations, the control signaling includes an indication of the ID of the group of UEs in accordance with a sidelink channel measurement by the UE satisfying a threshold sidelink channel measurement.

In some implementations, the communications manager 620 may be configured as or otherwise support a means for receiving, from one or more UEs, one or more reports indicating that each of the one or more UEs are associated with sidelink channel measurements that satisfy the threshold sidelink channel measurement. In some implementations, the communications manager 620 may be configured as or otherwise support a means for transmitting, to the network entity, an indication that the one or more UEs are part of the group of UEs in accordance with each of the one or more UEs being associated with the sidelink channel measurements that satisfy the threshold sidelink channel measurement.

In some implementations, the communications manager 620 may be configured as or otherwise support a means for measuring an RTT associated with an uplink message and a downlink message communicated between the UE and the network entity, where the UE measures the RTT in accordance with the UE being a group leader of the group of UEs, each UE of the group of UEs measuring an RTT in turn, or each UE of the group of UEs measuring an RTT individually. In some implementations, the communications manager 620 may be configured as or otherwise support a means for transmitting, to the network entity, a PDC report including an indication of the RTT, where receiving the common set of one or more PDC values is associated with the transmitting of the PDC report.

In some implementations, the communications manager 620 may be configured as or otherwise support a means for transmitting, to the network entity, one or more SRSs. In some implementations, the UE transmits the one or more SRSs in accordance with the UE being a group leader of the group of UEs or each UE of the group of UEs transmitting one or more SRSs individually. In some implementations, receiving the common set of one or more PDC values is associated with the transmitting of the one or more SRSs.

In some implementations, to support receiving the common set of one or more PDC values in accordance with the ID of the group of UEs, the communications manager 620 may be configured as or otherwise support a means for receiving, over a downlink shared channel, an indication of the common set of one or more PDC values via a message that is scrambled in accordance with the ID of the group of UEs. In some implementations, to support receiving the common set of one or more PDC values in accordance with the ID of the group of UEs, the communications manager 620 may be configured as or otherwise support a means for decoding the message using the ID of the group of UEs.

In some implementations, the ID of the group of UEs is exclusive to the group of UEs. In some implementations, the message exclusively includes the common set of one or more PDC values for the group of UEs.

In some implementations, the ID of the group of UEs is common to multiple groups of UEs. In some implementations, the message includes a group ID associated with the group of UEs to indicate that the common set of one or more PDC values is for the group of UEs.

Additionally, or alternatively, the communications manager 620 may support wireless communication at a UE in accordance with examples as disclosed herein. For example, the communications manager 620 may be configured as or otherwise support a means for receiving, from a network entity, a set of one or more PDC values in accordance with a selection between a group-based PDC procedure for the UE and a UE-specific PDC procedure for the UE. The communications manager 620 may be configured as or otherwise support a means for communicating with the network entity in accordance with the set of one or more PDC values.

In some implementations, the communications manager 620 may be configured as or otherwise support a means for receiving, from the network entity, an indication associated with the selection between the group-based PDC procedure for the UE and the UE-specific PDC procedure for the UE, where receiving the set of one or more PDC values is associated with the receiving of the indication associated with the selection.

In some implementations, the indication associated with the selection indicates the group-based PDC procedure for the UE in accordance with the arrival time satisfying a threshold time difference from an expected arrival time. In some implementations, the indication associated with the selection indicates the UE-specific PDC procedure for the UE in accordance with the arrival time failing to satisfy the threshold time difference from the expected arrival time.

In some implementations, the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

In some implementations, the communications manager 620 may be configured as or otherwise support a means for transmitting, to the network entity, an indication associated with the selection between the group-based PDC procedure for the UE and the UE-specific PDC procedure for the UE, where receiving the set of one or more PDC values is associated with the transmitting of the indication associated with the selection.

In some implementations, the indication associated with the selection indicates the UE-specific PDC procedure for the UE, and the communications manager 620 may be configured as or otherwise support a means for transmitting, to the network entity, an indication of whether a PDC report associated with the UE-specific PDC procedure is periodic, aperiodic, or semi-persistent.

In some implementations, the selection is in accordance with a clock accuracy constraint of the UE.

In some implementations, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of techniques for PDC as described herein, or the processor 640 and the memory 630 may be otherwise configured to perform or support such operations.

Figure 7:
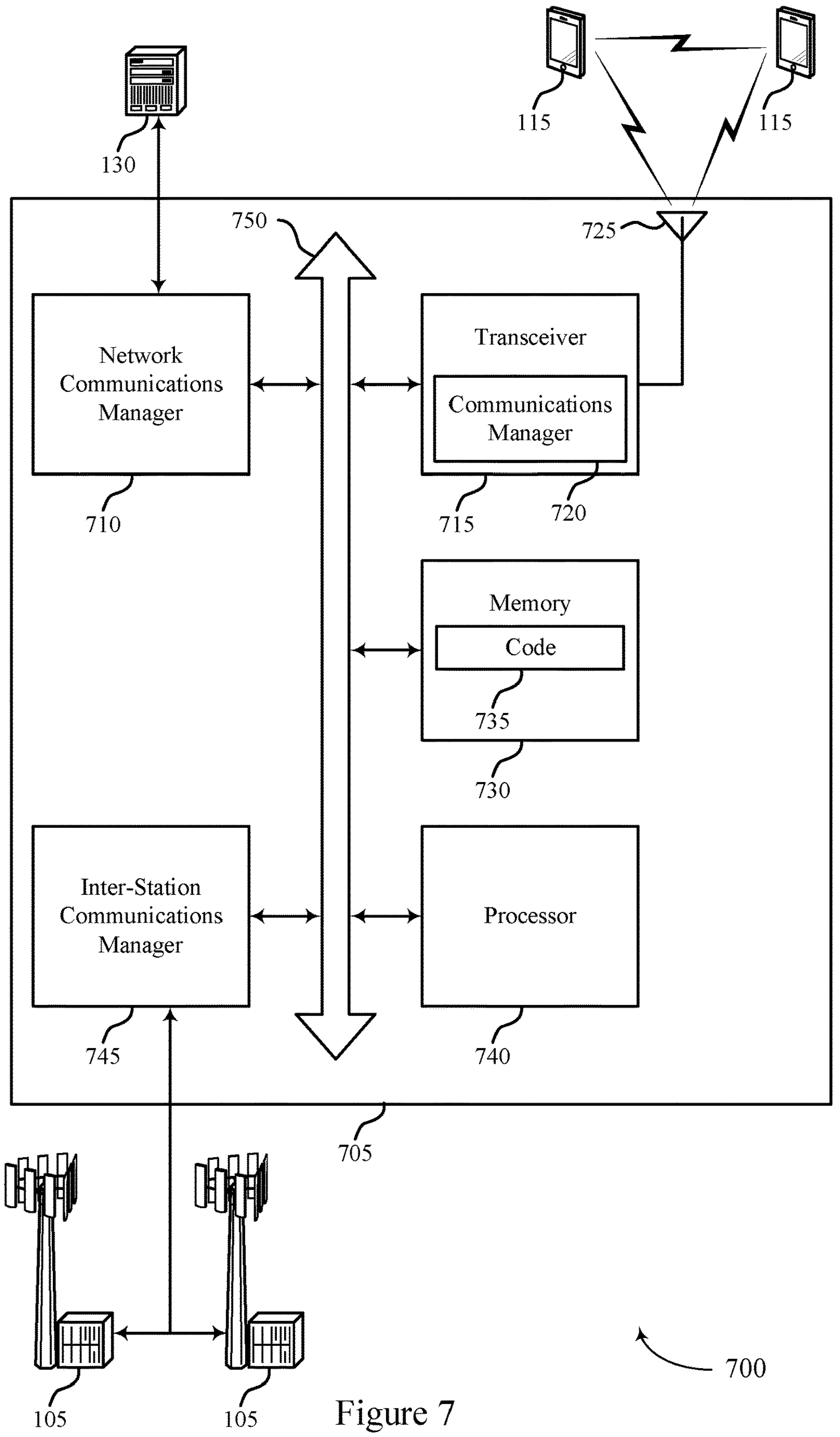

FIG. 7 shows a diagram 700 of an example device 705 that supports techniques for PDC. The device 705 may communicate wirelessly with one or more components of one or more BSs 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (such as operatively, communicatively, functionally, electronically, electrically) via one or more buses (such as a bus 750).

The network communications manager 710 may manage communications with a core network 130 (such as via one or more wired backhaul links). For example, the network communications manager 710 may manage the transfer of data communications for client devices, such as one or more UEs 115.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations associated with received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (such as the processor 740, or the memory 730, or both), may be included in a chip or chip assembly that is installed in the device 705.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (such as when compiled and executed) to perform functions described herein. In some implementations, the memory 730 may contain, among other things, a BIOS which may control basic hardware or software operation such as the interaction with peripheral components or devices.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705.

The processing system of the device 705 may interface with other components of the device 705 and may process information received from other components (such as inputs or signals) or output information to other components. For example, a chip or modem of the device 705 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The inter-station communications manager 745 may manage communications with one or more components of other BSs 105 and may include a controller or scheduler for controlling communications with UEs 115 in cooperation with one or more components of other BSs 105. For example, the inter-station communications manager 745 may coordinate scheduling for transmissions to UEs 115 for various interference mitigation techniques such as beamforming or joint transmission. In some implementations, the inter-station communications manager 745 may provide an X2 interface within an LTE/LTE-A wireless communications network technology to provide communication between one or more components of BSs 105.

The communications manager 720 may support wireless communication at a network entity in accordance with examples as disclosed herein. For example, the communications manager 720 may be configured as or otherwise support a means for transmitting, to a UE, control signaling indicating an ID of a group of UEs associated with a common set of one or more PDC values. The communications manager 720 may be configured as or otherwise support a means for transmitting, to the UE, the common set of one or more PDC values in accordance with the ID of the group of UEs. The communications manager 720 may be configured as or otherwise support a means for communicating with the UE in accordance with the common set of one or more PDC values.

In some implementations, the control signaling includes an indication of the ID of the group of UEs in accordance with a communication type associated with the UE.

In some implementations, the communication type is associated with a set of UEs of the group of UEs being commonly connected to a center UE of the group of UEs. In some implementations, each UE of the set of UEs is within a threshold distance of the center UE.

In some implementations, the control signaling includes an indication of the ID of the group of UEs in accordance with the UE being located in a geographic area associated with a same zone ID as others of the group of UEs.

In some implementations, the control signaling includes an indication of the ID of the group of UEs in accordance with a sidelink channel measurement by the UE satisfying a threshold sidelink channel measurement.

In some implementations, the communications manager 720 may be configured as or otherwise support a means for receiving, from the UE, an indication of the group of UEs in accordance with UEs of the group of UEs being associated with sidelink channel measurements that satisfy the threshold sidelink channel measurement.

In some implementations, the communications manager 720 may be configured as or otherwise support a means for receiving, from at least the UE, one or more PDC reports including indications of RTTs associated with uplink messaging and downlink messaging communicated between the network entity and at least the UE, where. In some implementations, the communications manager 720 may be configured as or otherwise support a means for receiving the one or more PDC reports including the indications of the RTTs from at least the UE is in accordance with the UE being a group leader of the group of UEs, each UE of the group of UEs reporting an RTT in turn, or each UE of the group of UEs reporting an RTT individually. In some implementations, the communications manager 720 may be configured as or otherwise support a means for transmitting the common set of one or more PDC values is associated with the receiving of the one or more PDC reports.

In some implementations, the communications manager 720 may be configured as or otherwise support a means for receiving, from at least the UE, one or more SRSs, where the network entity receives the one or more SRSs from at least the UE in accordance with the UE being a group leader of the group of UEs or each UE of the group of UEs transmitting one or more SRSs individually. In some implementations, transmitting the common set of one or more PDC values is associated with the receiving of the one or more SRSs from at least the UE.

In some implementations, to support transmitting the common set of one or more PDC values in accordance with the ID of the group of UEs, the communications manager 720 may be configured as or otherwise support a means for encoding a message including an indication of the common set of one or more PDC values via a scrambling of the message in accordance with the ID of the group of UEs. In some implementations, to support transmitting the common set of one or more PDC values in accordance with the ID of the group of UEs, the communications manager 720 may be configured as or otherwise support a means for transmitting, over a downlink shared channel, the indication of the common set of one or more PDC values via the message that is scrambled in accordance with the ID of the group of UEs.

In some implementations, the ID of the group of UEs is exclusive to the group of UEs. In some implementations, the message exclusively includes the common set of one or more PDC values for the group of UEs.

In some implementations, the ID of the group of UEs is common to multiple groups of UEs. In some implementations, the message includes a group ID associated with the group of UEs to indicate that the common set of one or more PDC values is for the group of UEs.

Additionally, or alternatively, the communications manager 720 may support wireless communication at a network entity in accordance with examples as disclosed herein. For example, the communications manager 720 may be configured as or otherwise support a means for transmitting, to a UE, a set of one or more PDC values in accordance with a selection between a group-based PDC procedure for the UE and a UE-specific PDC procedure for the UE. The communications manager 720 may be configured as or otherwise support a means for communicating with the UE in accordance with the set of one or more PDC values.

In some implementations, the communications manager 720 may be configured as or otherwise support a means for transmitting, to the UE, an indication associated with the selection between the group-based PDC procedure for the UE and the UE-specific PDC procedure for the UE, where transmitting the set of one or more PDC values is associated with the transmitting of the indication associated with the selection.

In some implementations, the indication associated with the selection indicates the group-based PDC procedure for the UE in accordance with the arrival time satisfying a threshold time difference from an expected arrival time. In some implementations, the indication associated with the selection indicates the UE-specific PDC procedure for the UE in accordance with the arrival time failing to satisfy the threshold time difference from the expected arrival time.

In some implementations, the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

In some implementations, the communications manager 720 may be configured as or otherwise support a means for receiving, from the UE, an indication associated with the selection between the group-based PDC procedure for the UE and the UE-specific PDC procedure for the UE, where transmitting the set of one or more PDC values is associated with the receiving of the indication associated with the selection.

In some implementations, the indication associated with the selection indicates the UE-specific PDC procedure for the UE, and the communications manager 720 may be configured as or otherwise support a means for receiving, from the UE, an indication of whether a PDC report associated with the UE-specific PDC procedure is periodic, aperiodic, or semi-persistent.

In some implementations, the selection is in accordance with a clock accuracy constraint of the UE.

In some implementations, the communications manager 720 may be configured to perform various operations (such as receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for PDC as described herein, or the processor 740 and the memory 730 may be otherwise configured to perform or support such operations.

Figure 8:
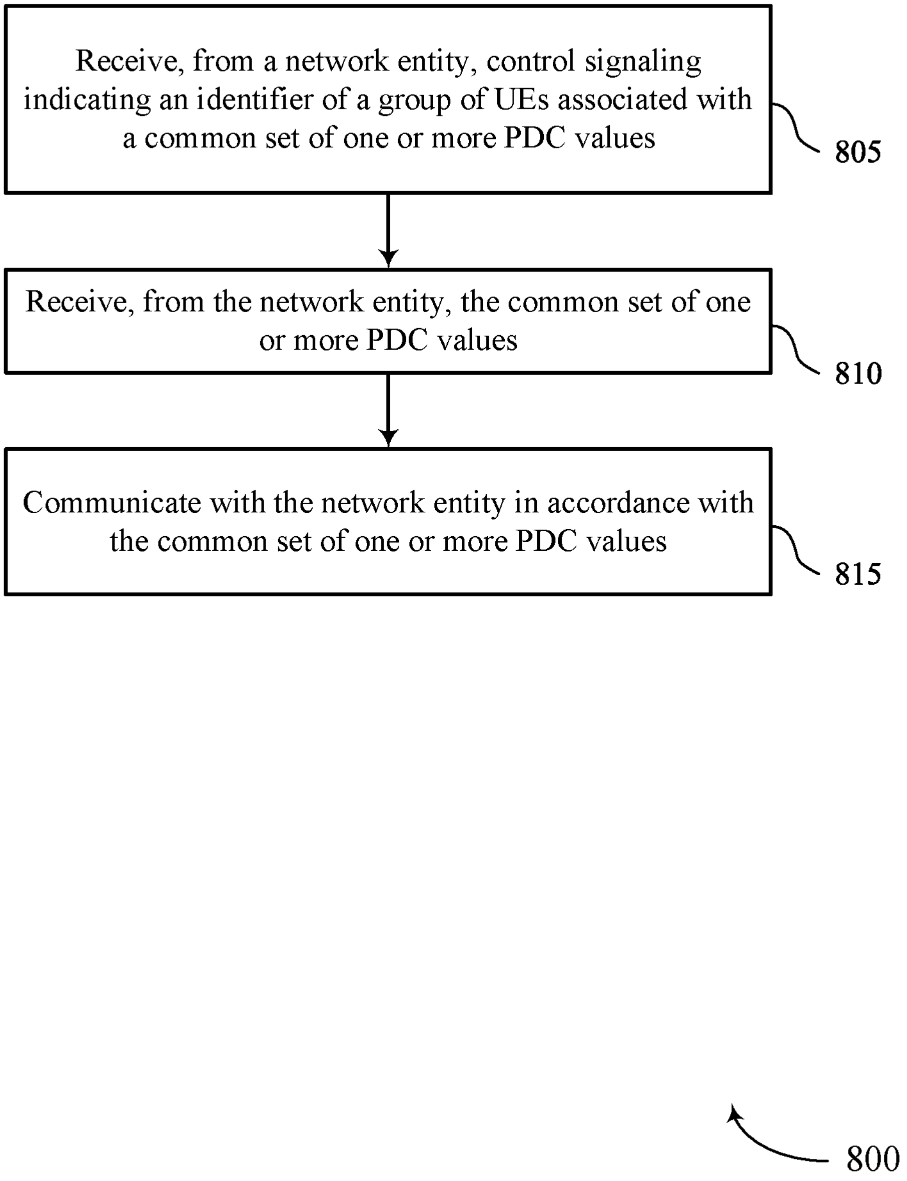
FIGS. 8-11 show flowcharts illustrating example methods that support techniques for PDC.

FIG. 8 shows a flowchart illustrating an example method 800 that supports techniques for PDC. The operations of the method 800 may be implemented by a UE or its components as described herein. For example, the operations of the method 800 may be performed by a UE 115 as described with reference to FIGS. 1-6. In some implementations, a UE may execute a set of instructions to control the functional elements of the UE to perform the described functions. Additionally, or alternatively, the UE may perform aspects of the described functions using special-purpose hardware.

At 805, the method may include receiving, from a network entity, control signaling indicating an ID of a group of UEs associated with a common set of one or more PDC values. The operations of 805 may be performed in accordance with examples as disclosed herein.

At 810, the method may include receiving, from the network entity, the common set of one or more PDC values. The operations of 810 may be performed in accordance with examples as disclosed herein.

At 815, the method may include communicating with the network entity in accordance with the common set of one or more PDC values. The operations of 815 may be performed in accordance with examples as disclosed herein.

Figure 9:
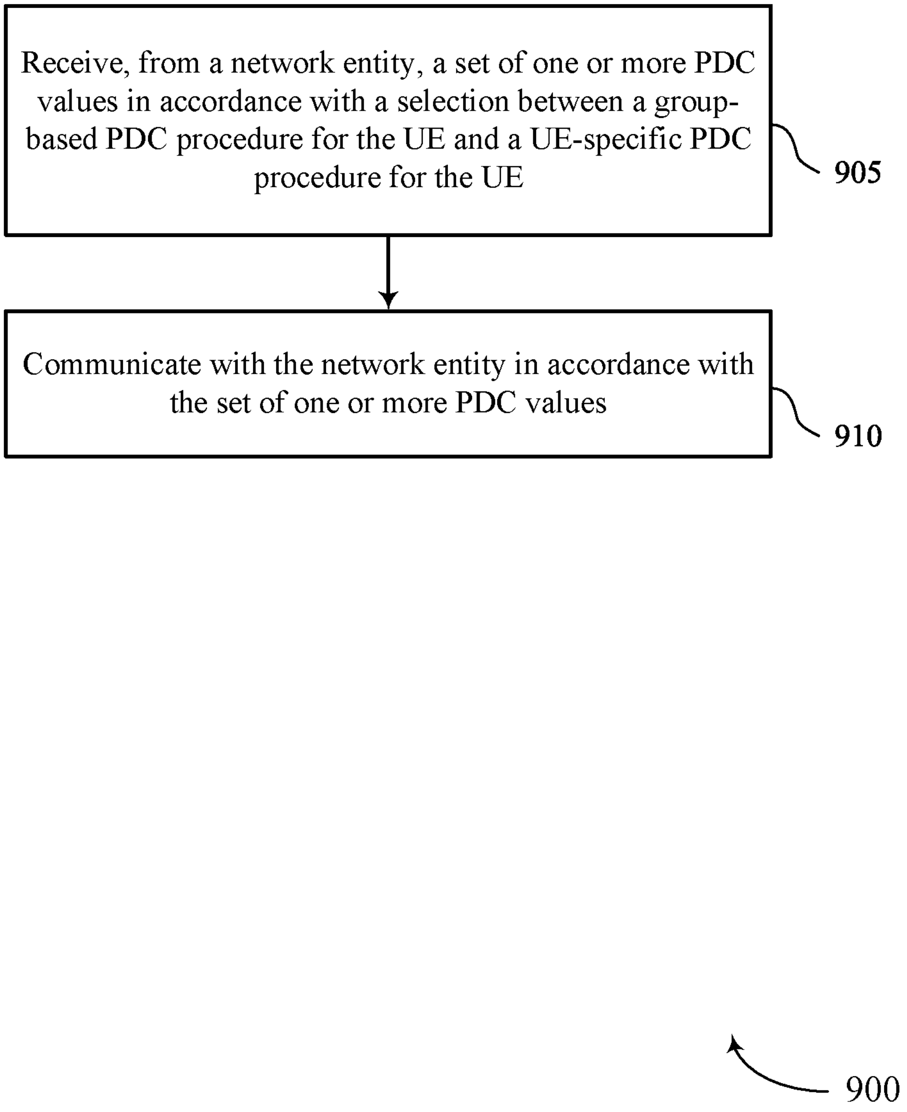

FIG. 9 shows a flowchart illustrating an example method 900 that supports techniques for PDC. The operations of the method 900 may be implemented by a UE or its components as described herein. For example, the operations of the method 900 may be performed by a UE 115 as described with reference to FIGS. 1-6. In some implementations, a UE may execute a set of instructions to control the functional elements of the UE to perform the described functions. Additionally, or alternatively, the UE may perform aspects of the described functions using special-purpose hardware.

At 905, the method may include receiving, from a network entity, a set of one or more PDC values in accordance with a selection between a group-based PDC procedure for the UE and a UE-specific PDC procedure for the UE. The operations of 905 may be performed in accordance with examples as disclosed herein.

At 910, the method may include communicating with the network entity in accordance with the set of one or more PDC values. The operations of 910 may be performed in accordance with examples as disclosed herein.

Figure 10:
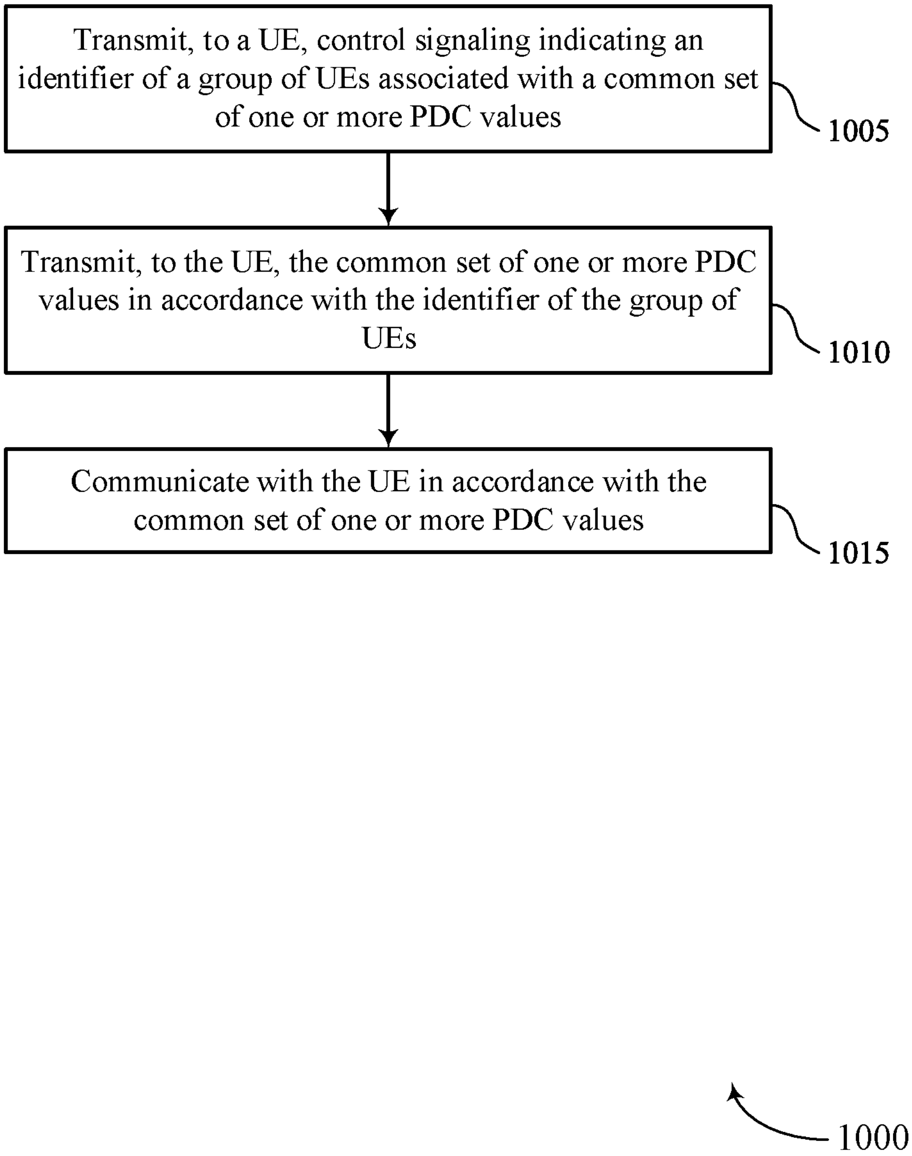

FIG. 10 shows a flowchart illustrating an example method 1000 that supports techniques for PDC. The operations of the method 1000 may be implemented by a BS or its components as described herein. For example, the operations of the method 1000 may be performed by one or more components of a BS 105 as described with reference to FIGS. 1-5 and 7. In some implementations, one or more components of a BS or a network entity may execute a set of instructions to control the functional elements of one or more components of the BS to perform the described functions. Additionally, or alternatively, one or more components of the BS may perform aspects of the described functions using special-purpose hardware.

At 1005, the method may include transmitting, to a UE, control signaling indicating an ID of a group of UEs associated with a common set of one or more PDC values. The operations of 1005 may be performed in accordance with examples as disclosed herein.

At 1010, the method may include transmitting, to the UE, the common set of one or more PDC values in accordance with the ID of the group of UEs. The operations of 1010 may be performed in accordance with examples as disclosed herein.

At 1015, the method may include communicating with the UE in accordance with the common set of one or more PDC values. The operations of 1015 may be performed in accordance with examples as disclosed herein.

Figure 11:
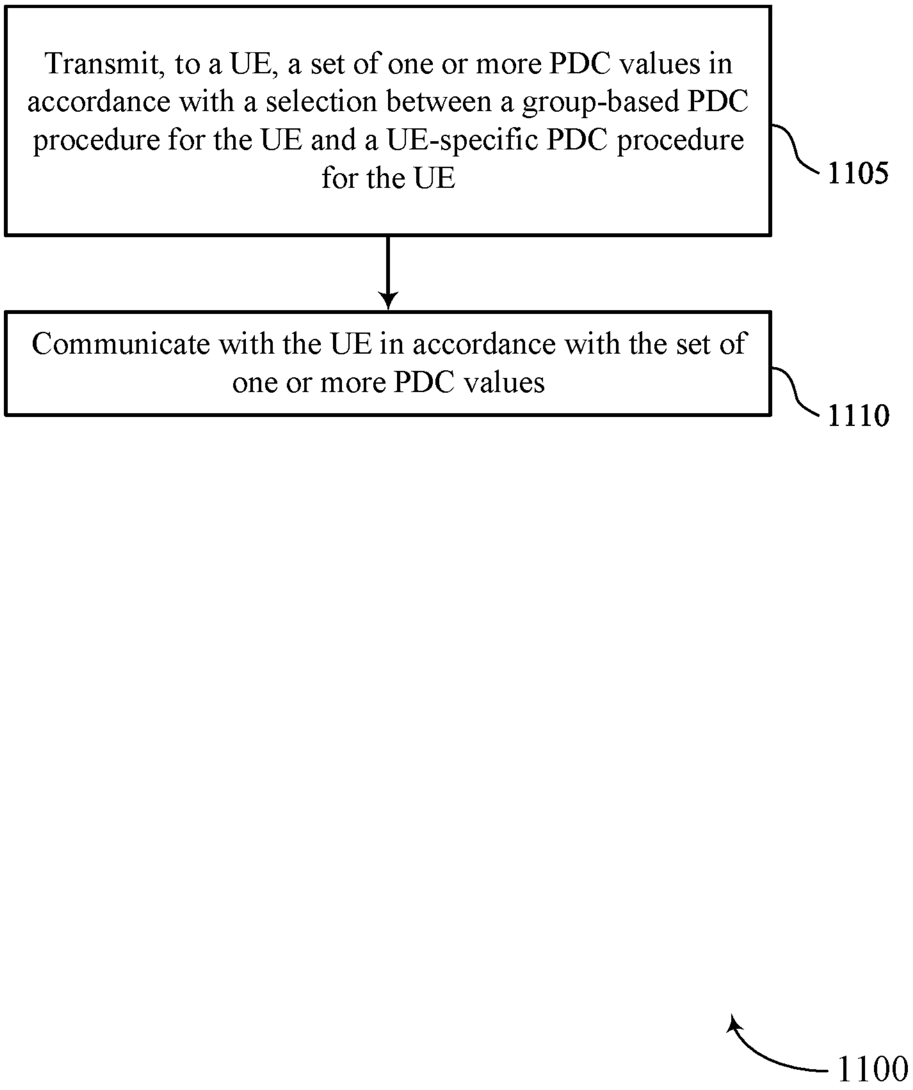

FIG. 11 shows a flowchart illustrating an example method 1100 that supports techniques for PDC. The operations of the method 1100 may be implemented by a BS or its components as described herein. For example, the operations of the method 1100 may be performed by one or more components of a BS 105 as described with reference to FIGS. 1-5 and 7. In some implementations, one or more components of a BS or a network entity may execute a set of instructions to control the functional elements of one or more components of the BS to perform the described functions. Additionally, or alternatively, one or more components of the BS may perform aspects of the described functions using special-purpose hardware.

At 1105, the method may include transmitting, to a UE, a set of one or more PDC values in accordance with a selection between a group-based PDC procedure for the UE and a UE-specific PDC procedure for the UE. The operations of 1105 may be performed in accordance with examples as disclosed herein.

At 1110, the method may include communicating with the UE in accordance with the set of one or more PDC values. The operations of 1110 may be performed in accordance with examples as disclosed herein.

The following provides an overview of some aspects of the present disclosure:

Aspect 1: A method for wireless communication at a UE, including: receiving, from a network entity, control signaling indicating an ID of a group of UEs associated with a common set of one or more PDC values: receiving, from the network entity, the common set of one or more PDC values; and communicating with the network entity in accordance with the common set of one or more PDC values.

Aspect 2: The method of aspect 1, where the control signaling includes an indication of the ID of the group of UEs in accordance with a communication type associated with the UE.

Aspect 3: The method of aspect 2, where the communication type is associated with a set of UEs of the group of UEs being commonly connected to a center UE of the group of UEs; and each UE of the set of UEs is within a threshold distance of the center UE.

Aspect 4: The method of any of aspects 1-3, where the control signaling includes an indication of the ID of the group of UEs in accordance with the UE being located in a geographic area associated with a same zone ID as others of the group of UEs.

Aspect 5: The method of any of aspects 1-4, where the control signaling includes an indication of the ID of the group of UEs in accordance with a sidelink channel measurement by the UE satisfying a threshold sidelink channel measurement.

Aspect 6: The method of aspect 5, further including: receiving, from one or more UEs, one or more reports indicating that each of the one or more UEs are associated with sidelink channel measurements that satisfy the threshold sidelink channel measurement; and transmitting, to the network entity, an indication that the one or more UEs are part of the group of UEs in accordance with each of the one or more UEs being associated with the sidelink channel measurements that satisfy the threshold sidelink channel measurement.

Aspect 7: The method of any of aspects 1-6, further including: measuring an RTT associated with an uplink message and a downlink message communicated between the UE and the network entity, where the UE measures the RTT in accordance with the UE being a group leader of the group of UEs, each UE of the group of UEs measuring an RTT in turn, or each UE of the group of UEs measuring an RTT individually; and transmitting, to the network entity, a PDC report including an indication of the RTT, where receiving the common set of one or more PDC values is associated with the transmitting of the PDC report.

Aspect 8: The method of any of aspects 1-7, further including: transmitting, to the network entity, one or more SRSs, where the UE transmits the one or more SRSs in accordance with the UE being a group leader of the group of UEs or each UE of the group of UEs transmitting one or more SRSs individually, and where receiving the common set of one or more PDC values is associated with the transmitting of the one or more SRSs.

Aspect 9: The method of any of aspects 1-8, where receiving the common set of one or more PDC values in accordance with the ID of the group of UEs includes: receiving, over a downlink shared channel, an indication of the common set of one or more PDC values via a message that is scrambled in accordance with the ID of the group of UEs; and decoding the message using the ID of the group of UEs.

Aspect 10: The method of aspect 9, where the ID of the group of UEs is exclusive to the group of UEs, and the message exclusively includes the common set of one or more PDC values for the group of UEs.

Aspect 11: The method of aspect 9, where the ID of the group of UEs is common to multiple groups of UEs, and the message includes a group ID associated with the group of UEs to indicate that the common set of one or more PDC values is for the group of UEs.

Aspect 12: A method for wireless communication at a UE, including: receiving, from a network entity, a set of one or more PDC values in accordance with a selection between a group-based PDC procedure for the UE and a UE-specific PDC procedure for the UE; and communicating with the network entity in accordance with the set of one or more PDC values.

Aspect 13: The method of aspect 12, further including: receiving, from the network entity, an indication associated with the selection between the group-based PDC procedure for the UE and the UE-specific PDC procedure for the UE, where receiving the set of one or more PDC values is associated with the receiving of the indication associated with the selection.

Aspect 14: The method of aspect 13, where receiving the indication associated with the selection is in accordance with an arrival time, at the network entity, of one or more uplink messages from the UE, and where the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 15: The method of any of aspects 13 or 14, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 16: The method of aspect 12, further including: transmitting, to the network entity, an indication associated with the selection between the group-based PDC procedure for the UE and the UE-specific PDC procedure for the UE, where receiving the set of one or more PDC values is associated with the transmitting of the indication associated with the selection.

Aspect 17: The method of aspect 16, where the indication associated with the selection indicates the UE-specific PDC procedure for the UE, the method further including: transmitting, to the network entity, an indication of whether a PDC report associated with the UE-specific PDC procedure is periodic, aperiodic, or semi-persistent.

Aspect 18: The method of any of aspects 12-17, where the selection is in accordance with a clock accuracy constraint of the UE.

Aspect 19: A method for wireless communication at a network entity, including: transmitting, to a UE, control signaling indicating an ID of a group of UEs associated with a common set of one or more PDC values: transmitting, to the UE, the common set of one or more PDC values in accordance with the ID of the group of UEs; and communicating with the UE in accordance with the common set of one or more PDC values.

Aspect 20: The method of aspect 19, where the control signaling includes an indication of the ID of the group of UEs in accordance with a communication type associated with the UE.

Aspect 21: The method of aspect 20, where the communication type is associated with a set of UEs of the group of UEs being commonly connected to a center UE of the group of UEs; and each UE of the set of UEs is within a threshold distance of the center UE.

Aspect 22: The method of any of aspects 19-21, where the control signaling includes an indication of the ID of the group of UEs in accordance with the UE being located in a geographic area associated with a same zone ID as others of the group of UEs.

Aspect 23: The method of any of aspects 19-22, where the control signaling includes an indication of the ID of the group of UEs in accordance with a sidelink channel measurement by the UE satisfying a threshold sidelink channel measurement.

Aspect 24: The method of aspect 23, further including: receiving, from the UE, an indication of the group of UEs in accordance with UEs of the group of UEs being associated with sidelink channel measurements that satisfy the threshold sidelink channel measurement.

Aspect 25: The method of any of aspects 19-24, further including: receiving, from at least the UE, one or more PDC reports including indications of RTTs associated with uplink messaging and downlink messaging communicated between the network entity and at least the UE, where: receiving the one or more PDC reports including the indications of the RTTs from at least the UE is in accordance with the UE being a group leader of the group of UEs, each UE of the group of UEs reporting an RTT in turn, or each UE of the group of UEs reporting an RTT individually; and transmitting the common set of one or more PDC values is associated with the receiving of the one or more PDC reports.

Aspect 26: The method of any of aspects 19-25, further including: receiving, from at least the UE, one or more SRSs, where the network entity receives the one or more SRSs from at least the UE in accordance with the UE being a group leader of the group of UEs or each UE of the group of UEs transmitting one or more SRSs individually, and where transmitting the common set of one or more PDC values is associated with the receiving of the one or more SRSs from at least the UE.

Aspect 27: The method of any of aspects 19-26, where transmitting the common set of one or more PDC values in accordance with the ID of the group of UEs includes: encoding a message including an indication of the common set of one or more PDC values via a scrambling of the message in accordance with the ID of the group of UEs; and transmitting, over a downlink shared channel, the indication of the common set of one or more PDC values via the message that is scrambled in accordance with the ID of the group of UEs.

Aspect 28: The method of aspect 27, where the ID of the group of UEs is exclusive to the group of UEs, and the message exclusively includes the common set of one or more PDC values for the group of UEs.

Aspect 29: The method of aspect 27, where the ID of the group of UEs is common to multiple groups of UEs, and the message includes a group ID associated with the group of UEs to indicate that the common set of one or more PDC values is for the group of UEs.

Aspect 30: A method for wireless communication at a network entity, including: transmitting, to a UE, a set of one or more PDC values in accordance with a selection between a group-based PDC procedure for the UE and a UE-specific PDC procedure for the UE; and communicating with the UE in accordance with the set of one or more PDC values.

Aspect 31: The method of aspect 30, further including: transmitting, to the UE, an indication associated with the selection between the group-based PDC procedure for the UE and the UE-specific PDC procedure for the UE, where transmitting the set of one or more PDC values is associated with the transmitting of the indication associated with the selection.

Aspect 32: The method of aspect 31, where transmitting the indication associated with the selection is in accordance with an arrival time, at the network entity, of one or more uplink messages from the UE, and where the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 33: The method of any of aspects 31 or 32, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 34: The method of aspect 30, further including: receiving, from the UE, an indication associated with the selection between the group-based PDC procedure for the UE and the UE-specific PDC procedure for the UE, where transmitting the set of one or more PDC values is associated with the receiving of the indication associated with the selection.

Aspect 35: The method of aspect 34, where the indication associated with the selection indicates the UE-specific PDC procedure for the UE, the method further including: receiving, from the UE, an indication of whether a PDC report associated with the UE-specific PDC procedure is periodic, aperiodic, or semi-persistent.

Aspect 36: The method of any of aspects 30-35, where the selection is in accordance with a clock accuracy constraint of the UE.

Aspect 37: An apparatus for wireless communication at a UE, including: a processor: memory coupled with the processor; and instructions stored in the memory and executable by the processor to cause the apparatus to: receive, from a network entity, control signaling indicating an ID of a group of UEs associated with a common set of one or more PDC values: receive, from the network entity, the common set of one or more PDC values; and communicate with the network entity in accordance with the common set of one or more PDC values.

Aspect 38: The apparatus of aspect 37, where the control signaling includes an indication of the ID of the group of UEs in accordance with a communication type associated with the UE.

Aspect 39: The apparatus of aspect 38, where the communication type is associated with a set of UEs of the group of UEs being commonly connected to a center UE of the group of UEs; and each UE of the set of UEs is within a threshold distance of the center UE.

Aspect 40: The apparatus of any of aspects 37-39, where the control signaling includes an indication of the ID of the group of UEs in accordance with the UE being located in a geographic area associated with a same zone ID as others of the group of UEs.

Aspect 41: The apparatus of any of aspects 37-40, where the control signaling includes an indication of the ID of the group of UEs in accordance with a sidelink channel measurement by the UE satisfying a threshold sidelink channel measurement.

Aspect 42: The apparatus of aspect 41, where the instructions are further executable by the processor to cause the apparatus to: receive, from one or more UEs, one or more reports indicating that each of the one or more UEs are associated with sidelink channel measurements that satisfy the threshold sidelink channel measurement; and transmit, to the network entity, an indication that the one or more UEs are part of the group of UEs in accordance with each of the one or more UEs being associated with the sidelink channel measurements that satisfy the threshold sidelink channel measurement.

Aspect 43: The apparatus of any of aspects 37-42, where the instructions are further executable by the processor to cause the apparatus to: measure an RTT associated with an uplink message and a downlink message communicated between the UE and the network entity, where the UE measures the RTT in accordance with the UE being a group leader of the group of UEs, each UE of the group of UEs measuring an RTT in turn, or each UE of the group of UEs measuring an RTT individually; and transmit, to the network entity, a PDC report including an indication of the RTT, where receiving the common set of one or more PDC values is associated with the transmitting of the PDC report.

Aspect 44: The apparatus of any of aspects 37-43, where the instructions are further executable by the processor to cause the apparatus to: transmit, to the network entity, one or more SRSs, where the UE transmits the one or more SRSs in accordance with the UE being a group leader of the group of UEs or each UE of the group of UEs transmitting one or more SRSs individually, and where receiving the common set of one or more PDC values is associated with the transmitting of the one or more SRSs.

Aspect 45: The apparatus of any of aspects 37-44, where the instructions to receive the common set of one or more PDC values in accordance with the ID of the group of UEs are executable by the processor to cause the apparatus to: receive, over a downlink shared channel, an indication of the common set of one or more PDC values via a message that is scrambled in accordance with the ID of the group of UEs; and decode the message using the ID of the group of UEs.

Aspect 46: The apparatus of aspect 45, where the ID of the group of UEs is exclusive to the group of UEs, and the message exclusively includes the common set of one or more PDC values for the group of UEs.

Aspect 47: The apparatus of aspect 45, where the ID of the group of UEs is common to multiple groups of UEs, and the message includes a group ID associated with the group of UEs to indicate that the common set of one or more PDC values is for the group of UEs.

Aspect 48: An apparatus for wireless communication at a UE, including: a processor; memory coupled with the processor; and instructions stored in the memory and executable by the processor to cause the apparatus to: receive, from a network entity, a set of one or more PDC values in accordance with a selection between a group-based PDC procedure for the UE and a UE-specific PDC procedure for the UE; and communicate with the network entity in accordance with the set of one or more PDC values.

Aspect 49: The apparatus of aspect 48, where the instructions are further executable by the processor to cause the apparatus to: receive, from the network entity, an indication associated with the selection between the group-based PDC procedure for the UE and the UE-specific PDC procedure for the UE, where receiving the set of one or more PDC values is associated with the receiving of the indication associated with the selection.

Aspect 50: The apparatus of aspect 49, where the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 51: The apparatus of any of aspects 49 or 50, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 52: The apparatus of aspect 48, where the instructions are further executable by the processor to cause the apparatus to: transmit, to the network entity, an indication associated with the selection between the group-based PDC procedure for the UE and the UE-specific PDC procedure for the UE, where receiving the set of one or more PDC values is associated with the transmitting of the indication associated with the selection.

Aspect 53: The apparatus of aspect 52, where the indication associated with the selection indicates the UE-specific PDC procedure for the UE, and the instructions are further executable by the processor to cause the apparatus to: transmit, to the network entity, an indication of whether a PDC report associated with the UE-specific PDC procedure is periodic, aperiodic, or semi-persistent.

Aspect 54: The apparatus of any of aspects 48-53, where the selection is in accordance with a clock accuracy constraint of the UE.

Aspect 55: An apparatus for wireless communication at a network entity, including: a processor: memory coupled with the processor; and instructions stored in the memory and executable by the processor to cause the apparatus to: transmit, to a UE, control signaling indicating an ID of a group of UEs associated with a common set of one or more PDC values: transmit, to the UE, the common set of one or more PDC values in accordance with the ID of the group of UEs; and communicate with the UE in accordance with the common set of one or more PDC values.

Aspect 56: The apparatus of aspect 55, where the control signaling includes an indication of the ID of the group of UEs in accordance with a communication type associated with the UE.

Aspect 57: The apparatus of aspect 56, where the communication type is associated with a set of UEs of the group of UEs being commonly connected to a center UE of the group of UEs; and each UE of the set of UEs is within a threshold distance of the center UE.

Aspect 58: The apparatus of any of aspects 55-57, where the control signaling includes an indication of the ID of the group of UEs in accordance with the UE being located in a geographic area associated with a same zone ID as others of the group of UEs.

Aspect 59: The apparatus of any of aspects 55-58, where the control signaling includes an indication of the ID of the group of UEs in accordance with a sidelink channel measurement by the UE satisfying a threshold sidelink channel measurement.

Aspect 60: The apparatus of aspect 59, where the instructions are further executable by the processor to cause the apparatus to: receive, from the UE, an indication of the group of UEs in accordance with UEs of the group of UEs being associated with sidelink channel measurements that satisfy the threshold sidelink channel measurement.

Aspect 61: The apparatus of any of aspects 55-60, where the instructions are further executable by the processor to cause the apparatus to: receive, from at least the UE, one or more PDC reports including indications of RTTs associated with uplink messaging and downlink messaging communicated between the network entity and at least the UE, where: receive the one or more PDC reports including the indications of the RTTs from at least the UE is in accordance with the UE being a group leader of the group of UEs, each UE of the group of UEs reporting an RTT in turn, or each UE of the group of UEs reporting an RTT individually; and transmit the common set of one or more PDC values is associated with the receiving of the one or more PDC reports.

Aspect 62: The apparatus of any of aspects 55-61, where the instructions are further executable by the processor to cause the apparatus to: receive, from at least the UE, one or more SRSs, where the network entity receives the one or more SRSs from at least the UE in accordance with the UE being a group leader of the group of UEs or each UE of the group of UEs transmitting one or more SRSs individually, and where transmitting the common set of one or more PDC values is associated with the receiving of the one or more SRSs from at least the UE.

Aspect 63: The apparatus of any of aspects 55-62, where the instructions to transmit the common set of one or more PDC values in accordance with the ID of the group of UEs are executable by the processor to cause the apparatus to: encode a message including an indication of the common set of one or more PDC values via a scrambling of the message in accordance with the ID of the group of UEs; and transmit, over a downlink shared channel, the indication of the common set of one or more PDC values via the message that is scrambled in accordance with the ID of the group of UEs.

Aspect 64: The apparatus of aspect 63, where the ID of the group of UEs is exclusive to the group of UEs, and the message exclusively includes the common set of one or more PDC values for the group of UEs.

Aspect 65: The apparatus of aspect 63, where the ID of the group of UEs is common to multiple groups of UEs, and the message includes a group ID associated with the group of UEs to indicate that the common set of one or more PDC values is for the group of UEs.

Aspect 66: An apparatus for wireless communication at a network entity, including: a processor: memory coupled with the processor; and instructions stored in the memory and executable by the processor to cause the apparatus to: transmit, to a UE, a set of one or more PDC values in accordance with a selection between a group-based PDC procedure for the UE and a UE-specific PDC procedure for the UE; and communicate with the UE in accordance with the set of one or more PDC values.

Aspect 67: The apparatus of aspect 66, where the instructions are further executable by the processor to cause the apparatus to: transmit, to the UE, an indication associated with the selection between the group-based PDC procedure for the UE and the UE-specific PDC procedure for the UE, where transmitting the set of one or more PDC values is associated with the transmitting of the indication associated with the selection.

Aspect 68: The apparatus of aspect 67, where the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 69: The apparatus of any of aspects 67 or 68, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 70: The apparatus of aspect 66, where the instructions are further executable by the processor to cause the apparatus to: receive, from the UE, an indication associated with the selection between the group-based PDC procedure for the UE and the UE-specific PDC procedure for the UE, where transmitting the set of one or more PDC values is associated with the receiving of the indication associated with the selection.

Aspect 71: The apparatus of aspect 70, where the indication associated with the selection indicates the UE-specific PDC procedure for the UE, and the instructions are further executable by the processor to cause the apparatus to: receive, from the UE, an indication of whether a PDC report associated with the UE-specific PDC procedure is periodic, aperiodic, or semi-persistent.

Aspect 72: The apparatus of any of aspects 66-71, where the selection is in accordance with a clock accuracy constraint of the UE.

Aspect 73: An apparatus for wireless communication at a UE, including: an interface configured to: obtain, from a network entity, control signaling indicating an ID of a group of UEs associated with a common set of one or more PDC values: obtain, from the network entity, the common set of one or more PDC values; and communicate with the network entity in accordance with the common set of one or more PDC values.

Aspect 74: The apparatus of aspect 73, where the control signaling includes an indication of the ID of the group of UEs in accordance with a communication type associated with the UE.

Aspect 75: The apparatus of aspect 74, where: the communication type is associated with a set of UEs of the group of UEs being commonly connected to a center UE of the group of UEs; and each UE of the set of UEs is within a threshold distance of the center UE.

Aspect 76: The apparatus of any of aspects 73-75, where the control signaling includes an indication of the ID of the group of UEs in accordance with the UE being located in a geographic area associated with a same zone ID as others of the group of UEs.

Aspect 77: The apparatus of any of aspects 73-76, where the control signaling includes an indication of the ID of the group of UEs in accordance with a sidelink channel measurement by the UE satisfying a threshold sidelink channel measurement.

Aspect 78: The apparatus of aspect 77, where the interface is further configured to: obtain, from one or more UEs, one or more reports indicating that each of the one or more UEs are associated with sidelink channel measurements that satisfy the threshold sidelink channel measurement; and output, to the network entity, an indication that the one or more UEs are part of the group of UEs in accordance with each of the one or more UEs being associated with the sidelink channel measurements that satisfy the threshold sidelink channel measurement.

Aspect 79: The apparatus of any of aspects 73-78, further including: a processing system configured to: measure an RTT associated with an uplink message and a downlink message communicated between the UE and the network entity, where the UE measures the RTT in accordance with the UE being a group leader of the group of UEs, each UE of the group of UEs measuring an RTT in turn, or each UE of the group of UEs measuring an RTT individually; and where the interface is further configured to: output, to the network entity, a PDC report including an indication of the RTT, where obtaining the common set of one or more PDC values is associated with the outputting of the PDC report.

Aspect 80: The apparatus of any of aspects 73-79, where the interface is further configured to: output, to the network entity, one or more SRSs, where the UE outputs the one or more SRSs in accordance with the UE being a group leader of the group of UEs or each UE of the group of UEs outputting one or more SRSs individually, and where obtaining the common set of one or more PDC values is associated with the outputting of the one or more SRSs.

Aspect 81: The apparatus of any of aspects 73-80, where, to obtain the common set of one or more PDC values in accordance with the ID of the group of UEs, the interface is further configured to: obtain, over a downlink shared channel, an indication of the common set of one or more PDC values via a message that is scrambled in accordance with the ID of the group of UEs; and a processing system is configured to: decode the message using the ID of the group of UEs.

Aspect 82: The apparatus of aspect 81, where the ID of the group of UEs is exclusive to the group of UEs, and the message exclusively includes the common set of one or more PDC values for the group of UEs.

Aspect 83: The apparatus of aspect 81, where the ID of the group of UEs is common to multiple groups of UEs, and the message includes a group ID associated with the group of UEs to indicate that the common set of one or more PDC values is for the group of UEs.

Aspect 84: An apparatus for wireless communication at a UE, including: an interface configured to: obtain, from a network entity, a set of one or more PDC values in accordance with a selection between a group-based PDC procedure for the UE and a UE-specific PDC procedure for the UE; and communicate with the network entity in accordance with the set of one or more PDC values.

Aspect 85: The apparatus of aspect 84, where the interface is further configured to: obtain, from the network entity, an indication associated with the selection between the group-based PDC procedure for the UE and the UE-specific PDC procedure for the UE, where obtaining the set of one or more PDC values is associated with the obtaining of the indication associated with the selection.

Aspect 86: The apparatus of aspect 85, where obtaining the indication associated with the selection is in accordance with an arrival time, at the network entity, of one or more uplink messages from the UE, and where: the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 87: The apparatus of any of aspects 85 or 86, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 88: The apparatus of aspect 84, where the interface is further configured to: output, to the network entity, an indication associated with the selection between the group-based PDC procedure for the UE and the UE-specific PDC procedure for the UE, where obtaining the set of one or more PDC values is associated with the outputting of the indication associated with the selection.

Aspect 89: The apparatus of aspect 88, where the indication associated with the selection indicates the UE-specific PDC procedure for the UE, and where the interface is further configured to: output, to the network entity, an indication of whether a PDC report associated with the UE-specific PDC procedure is periodic, aperiodic, or semi-persistent.

Aspect 90: The apparatus of any of aspects 84-89, where the selection is in accordance with a clock accuracy constraint of the UE.

Aspect 91: An apparatus for wireless communication at a network entity, including: an interface configured to: output, to a UE, control signaling indicating an ID of a group of UEs associated with a common set of one or more PDC values: output, to the UE, the common set of one or more PDC values in accordance with the ID of the group of UEs; and communicate with the UE in accordance with the common set of one or more PDC values.

Aspect 92: The apparatus of aspect 91, where the control signaling includes an indication of the ID of the group of UEs in accordance with a communication type associated with the UE.

Aspect 93: The apparatus of aspect 92, where: the communication type is associated with a set of UEs of the group of UEs being commonly connected to a center UE of the group of UEs; and each UE of the set of UEs is within a threshold distance of the center UE.

Aspect 94: The apparatus of any of aspects 91-93, where the control signaling includes an indication of the ID of the group of UEs in accordance with the UE being located in a geographic area associated with a same zone ID as others of the group of UEs.

Aspect 95: The apparatus of any of aspects 91-94, where the control signaling includes an indication of the ID of the group of UEs in accordance with a sidelink channel measurement by the UE satisfying a threshold sidelink channel measurement.

Aspect 96: The apparatus of aspect 95, where the interface is further configured to: obtain, from the UE, an indication of the group of UEs in accordance with UEs of the group of UEs being associated with sidelink channel measurements that satisfy the threshold sidelink channel measurement.

Aspect 97: The apparatus of any of aspects 91-96, where the interface is further configured to: obtain, from at least the UE, one or more PDC reports including indications of RTTs associated with uplink messaging and downlink messaging communicated between the network entity and at least the UE, where: obtaining the one or more PDC reports including the indications of the RTTs from at least the UE is in accordance with the UE being a group leader of the group of UEs, each UE of the group of UEs reporting an RTT in turn, or each UE of the group of UEs reporting an RTT individually;

and outputting the common set of one or more PDC values is associated with the obtaining of the one or more PDC reports.

Aspect 98: The apparatus of any of aspects 91-97, where the interface is further configured to: obtain, from at least the UE, one or more SRSs, where the network entity obtains the one or more SRSs from at least the UE in accordance with the UE being a group leader of the group of UEs or each UE of the group of UEs transmitting one or more SRSs individually, and where outputting the common set of one or more PDC values is associated with the obtaining of the one or more SRSs from at least the UE.

Aspect 99: The apparatus of any of aspects 91-98, where, to output the common set of one or more PDC values in accordance with the ID of the group of UEs, a processing system is configured to: encode a message including an indication of the common set of one or more PDC values via a scrambling of the message in accordance with the ID of the group of UEs; and the interface is configured to: output, over a downlink shared channel, the indication of the common set of one or more PDC values via the message that is scrambled in accordance with the ID of the group of UEs.

Aspect 100: The apparatus of aspect 99, where the ID of the group of UEs is exclusive to the group of UEs, and the message exclusively includes the common set of one or more PDC values for the group of UEs.

Aspect 101: The apparatus of aspect 99, where the ID of the group of UEs is common to multiple groups of UEs, and the message includes a group ID associated with the group of UEs to indicate that the common set of one or more PDC values is for the group of UEs.

Aspect 102: An apparatus for wireless communication at a network entity, including: an interface configured to: output, to a UE, a set of one or more PDC values in accordance with a selection between a group-based PDC procedure for the UE and a UE-specific PDC procedure for the UE; and communicate with the UE in accordance with the set of one or more PDC values.

Aspect 103: The apparatus of aspect 102, where the interface is further configured to: output, to the UE, an indication associated with the selection between the group-based PDC procedure for the UE and the UE-specific PDC procedure for the UE, where outputting the set of one or more PDC values is associated with the outputting of the indication associated with the selection.

Aspect 104: The apparatus of aspect 103, where outputting the indication associated with the selection is in accordance with an arrival time, at the network entity, of one or more uplink messages from the UE, and where: the indication associated with the selection indicates the group-based PDC procedure for the UE in accordance with the arrival time satisfying a threshold time difference from an expected arrival time: or the indication associated with the selection indicates the UE-specific PDC procedure for the UE in accordance with the arrival time failing to satisfy the threshold time difference from the expected arrival time.

Aspect 105: The apparatus of any of aspects 103 or 104, where the indication associated with the selection between the group-based PDC procedure for the UE and the UE-specific PDC procedure for the UE indicates whether the UE-specific PDC procedure is enabled for the UE and whether a PDC report associated with the UE-specific PDC procedure is periodic, aperiodic, or semi-persistent.

Aspect 106: The apparatus of aspect 102, where the interface is further configured to: obtain, from the UE, an indication associated with the selection between the group-based PDC procedure for the UE and the UE-specific PDC procedure for the UE, where outputting the set of one or more PDC values is associated with the obtaining of the indication associated with the selection.

Aspect 107: The apparatus of aspect 106, where the indication associated with the selection indicates the UE-specific PDC procedure for the UE, and where the interface is further configured to: obtain, from the UE, an indication of whether a PDC report associated with the UE-specific PDC procedure is periodic, aperiodic, or semi-persistent.

Aspect 108: The apparatus of any of aspects 102-107, where the selection is in accordance with a clock accuracy constraint of the UE.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above may not be understood as requiring such separation in all implementations, and it may be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
one or more antennas; and
a processing system, coupled with the one or more antennas, that comprises one or more processors and one or more memories that store code and are coupled with the one or more processors, the processing system configured to cause the UE to:
receive, from a network entity, control signaling indicating an identifier of a group of UEs associated with a common set of one or more propagation delay compensation (PDC) values;
receive, from the network entity, the common set of one or more PDC values; and
communicate with the network entity in accordance with the common set of one or more PDC values.

2. The UE of claim 1, wherein the control signaling comprises an indication of the identifier of the group of UEs in accordance with a communication type associated with the UE.

3. The UE of claim 2, wherein:
the communication type is associated with a set of UEs of the group of UEs being commonly connected to a center UE of the group of UEs; and
each UE of the set of UEs is within a threshold distance of the center UE.

4. The UE of claim 1, wherein the control signaling comprises an indication of the identifier of the group of UEs in accordance with the UE being located in a geographic area associated with a same zone identifier as others of the group of UEs.

5. The UE of claim 1, wherein the control signaling comprises an indication of the identifier of the group of UEs in accordance with a sidelink channel measurement by the UE satisfying a threshold sidelink channel measurement.

6. The UE of claim 5, wherein the processing system is further configured to cause the UE to:
receive, from one or more UEs, one or more reports indicating that each of the one or more UEs are associated with sidelink channel measurements that satisfy the threshold sidelink channel measurement; and
transmit, to the network entity, an indication that the one or more UEs are part of the group of UEs in accordance with each of the one or more UEs being associated with the sidelink channel measurements that satisfy the threshold sidelink channel measurement.

7. The UE of claim 1, wherein the processing system is further configured to cause the UE to:

measure a round-trip time (RTT) associated with an uplink message and a downlink message communicated between the UE and the network entity, wherein the UE measures the RTT in accordance with the UE being a group leader of the group of UEs, each UE of the group of UEs measuring an RTT in turn, or each UE of the group of UEs measuring an RTT individually; and transmit, to the network entity, a PDC report including an indication of the RTT, wherein receiving the common set of one or more PDC values is associated with the transmitting of the PDC report.

8. The UE of claim 1, wherein the processing system is further configured to cause the UE to:

transmit, to the network entity, one or more sounding reference signals (SRSs), wherein the UE transmits the one or more SRSs in accordance with the UE being a group leader of the group of UEs or each UE of the group of UEs transmitting one or more SRSs individually, and wherein receiving the common set of one or more PDC values is associated with the transmitting of the one or more SRSs.

9. The UE of claim 1, wherein, to receive the common set of one or more PDC values in accordance with the identifier of the group of UEs, the processing system is further configured to cause the UE to:

receive, via a downlink shared channel, an indication of the common set of one or more PDC values via a message that is scrambled in accordance with the identifier of the group of UEs; and decode the message using the identifier of the group of UEs.

10. The UE of claim 9, wherein the identifier of the group of UEs is exclusive to the group of UEs, and the message exclusively includes the common set of one or more PDC values for the group of UEs.

11. The UE of claim 9, wherein the identifier of the group of UEs is common to multiple groups of UEs, and the message includes a group identifier associated with the group of UEs to indicate that the common set of one or more PDC values is for the group of UEs.

12. A user equipment (UE), comprising:

one or more antennas; and a processing system, coupled with the one or more antennas, that comprises one or more processors and one or more memories that store code and are coupled with the one or more processors, the processing system configured to cause the UE to:

receive, from a network entity, a set of one or more propagation delay compensation (PDC) values in accordance with a selection between a group-based PDC procedure for the UE and a UE-specific PDC procedure for the UE; and communicate with the network entity in accordance with the set of one or more PDC values.

13. The UE of claim 12, wherein the processing system is further configured to cause the UE to:

receive, from the network entity, an indication associated with the selection between the group-based PDC procedure for the UE and the UE-specific PDC procedure for the UE, wherein receiving the set of one or more PDC values is associated with the receiving of the indication associated with the selection.

14. The UE of claim 13, wherein receiving the indication associated with the selection is in accordance with an arrival time, at the network entity, of one or more uplink messages from the UE, and wherein:

the indication associated with the selection indicates the group-based PDC procedure for the UE in accordance with the arrival time satisfying a threshold time difference from an expected arrival time; or the indication associated with the selection indicates the UE-specific PDC procedure for the UE in accordance with the arrival time failing to satisfy the threshold time difference from the expected arrival time.

15. The UE of claim 12, wherein the processing system is further configured to cause the UE to:

transmit, to the network entity, an indication associated with the selection between the group-based PDC procedure for the UE and the UE-specific PDC procedure for the UE, wherein receiving the set of one or more PDC values is associated with the transmitting of the indication associated with the selection.

16. A network entity, comprising:

one or more antennas; and a processing system, coupled with the one or more antennas, that comprises one or more processors and one or more memories that store code and are coupled with the one or more processors, the processing system configured to cause the network entity to:

transmit, to a user equipment (UE), control signaling indicating an identifier of a group of UEs associated with a common set of one or more propagation delay compensation (PDC) values;

transmit, to the UE, the common set of one or more PDC values in accordance with the identifier of the group of UEs; and communicate with the UE in accordance with the common set of one or more PDC values.

17. The network entity of claim 16, wherein the control signaling comprises an indication of the identifier of the group of UEs in accordance with a communication type associated with the UE.

18. The network entity of claim 17, wherein:

the communication type is associated with a set of UEs of the group of UEs being commonly connected to a center UE of the group of UEs; and each UE of the set of UEs is within a threshold distance of the center UE.

19. The network entity of claim 16, wherein the control signaling comprises an indication of the identifier of the group of UEs in accordance with the UE being located in a geographic area associated with a same zone identifier as others of the group of UEs.

20. The network entity of claim 16, wherein the control signaling comprises an indication of the identifier of the group of UEs in accordance with a sidelink channel measurement by the UE satisfying a threshold sidelink channel measurement.

21. The network entity of claim 20, wherein the processing system is further configured to cause the network entity to:

receive, from the UE, an indication of the group of UEs in accordance with UEs of the group of UEs being associated with sidelink channel measurements that satisfy the threshold sidelink channel measurement.

22. The network entity of claim 16, wherein the processing system is further configured to cause the network entity to:

receive, from at least the UE, one or more PDC reports including indications of round-trip times (RTTs) associated with uplink messaging and downlink messaging communicated between the network entity and at least the UE, wherein:

reception of the one or more PDC reports including the indications of the RTTs from at least the UE is in accordance with the UE being a group leader of the group of UEs, each UE of the group of UEs reporting an RTT in turn, or each UE of the group of UEs reporting an RTT individually; and transmission of the common set of one or more PDC values is associated with the reception of the one or more PDC reports.

23. The network entity of claim 16, wherein the processing system is further configured to cause the network entity to:

receive, from at least the UE, one or more sounding reference signals (SRSs), wherein the network entity receives the one or more SRSs from at least the UE in accordance with the UE being a group leader of the group of UEs or each UE of the group of UEs transmitting one or more SRSs individually, and wherein transmitting the common set of one or more PDC values is associated with the receiving of the one or more SRSs from at least the UE.

24. The network entity of claim 16, wherein, to transmit the common set of one or more PDC values in accordance with the identifier of the group of UEs, the processing system is further configured to cause the network entity to:

encode a message including an indication of the common set of one or more PDC values via a scrambling of the message in accordance with the identifier of the group of UEs; and transmit, via a downlink shared channel, the indication of the common set of one or more PDC values via the message that is scrambled in accordance with the identifier of the group of UEs.

25. The network entity of claim 24, wherein the identifier of the group of UEs is exclusive to the group of UEs, and the message exclusively includes the common set of one or more PDC values for the group of UEs.

26. The network entity of claim 24, wherein the identifier of the group of UEs is common to multiple groups of UEs, and the message includes a group identifier associated with the group of UEs to indicate that the common set of one or more PDC values is for the group of UEs.

27. A network entity, comprising:

one or more antennas; and a processing system, coupled with the one or more antennas, that comprises one or more processors and one or more memories that store code and are coupled with the one or more processors, the processing system configured to cause the network entity to:

transmit, to a user equipment (UE), a set of one or more propagation delay compensation (PDC) values in accordance with a selection between a group-based PDC procedure for the UE and a UE-specific PDC procedure for the UE; and communicate with the UE in accordance with the set of one or more PDC values.

28. The network entity of claim 27, wherein the processing system is further configured to cause the network entity to:

transmit, to the UE, an indication associated with the selection between the group-based PDC procedure for the UE and the UE-specific PDC procedure for the UE, wherein transmitting the set of one or more PDC values is associated with the transmitting of the indication associated with the selection.

29. The network entity of claim 28, wherein transmitting the indication associated with the selection is in accordance with an arrival time, at the network entity, of one or more uplink messages from the UE, and wherein:

the indication associated with the selection indicates the group-based PDC procedure for the UE in accordance with the arrival time satisfying a threshold time difference from an expected arrival time; or the indication associated with the selection indicates the UE-specific PDC procedure for the UE in accordance with the arrival time failing to satisfy the threshold time difference from the expected arrival time.

30. The network entity of claim 27, wherein the processing system is further configured to cause the network entity to:

receive, from the UE, an indication associated with the selection between the group-based PDC procedure for the UE and the UE-specific PDC procedure for the UE, wherein transmitting the set of one or more PDC values is associated with the receiving of the indication associated with the selection.

* * * * *